US012741655B1

(12) United States Patent
Hendy et al.

(10) Patent No.: US 12,741,655 B1
(45) Date of Patent: Sep. 22, 2026

(54) BEHAVIOR MODELING BASED ON RELATIVE POSITION DATA AND ABSOLUTE YAW DATA

(71) Applicant: Zoox, Inc., Foster City, CA (US)

(72) Inventors: Noureldin Ehab Hendy, South San Francisco, CA (US); Ethan Miller Pronovost, Seattle, WA (US); Peter Scott Schleede, El Dorado Hills, CA (US)

(73) Assignee: Zoox, Inc., Foster City, CA (US)

( * ) Notice: Subject to any disclaimer, the term of this patent is extended or adjusted under 35 U.S.C. 154(b) by 1 day.

(21) Appl. No.: 19/096,580

(22) Filed: Mar. 31, 2025

Related U.S. Application Data

(63) Continuation-in-part of application No. 18/887,489, filed on Sep. 17, 2024, now Pat. No. 12,612,073.

(51) Int. Cl.
*B60W 50/00* (2006.01)
*B60W 60/00* (2020.01)

(52) U.S. Cl.
CPC .......... *B60W 50/00* (2013.01); *B60W 60/001* (2020.02); *B60W 2050/0028* (2013.01); *B60W 2554/80* (2020.02); *B60W 2756/00* (2020.02)

(58) Field of Classification Search
None
See application file for complete search history.

(56) References Cited

U.S. PATENT DOCUMENTS 10,649,459 B2 * 5/2020 Wang .......................... G06T 7/11
12,326,919 B2 * 6/2025 Amato ................. G06V 20/584

* cited by examiner

*Primary Examiner* — Brandon D Lee
(74) *Attorney, Agent, or Firm* — Lee & Hayes, P.C.

(57) ABSTRACT

Techniques for performing prediction based on relative lateral and/or longitudinal position data are described herein. A vehicle may detect an object in an environment. The vehicle may generate an embedding associated with the object and input the embedding into a machine-learned model. The machine-learned model may generate a rotation matrix based on the lateral or longitudinal of object(s), and apply the rotation matrix to the embedding. Based on modifying the embedding (or generating a modified embedding), the attention layer of the machine-learned model may perform attention on the modified embedding and respond by outputting output data. The vehicle may rotate the output data (or generate rotated output data) which may be used by one or more machine-learned models to predict object behavior, generate vehicle actions, etc.

20 Claims, 9 Drawing Sheets

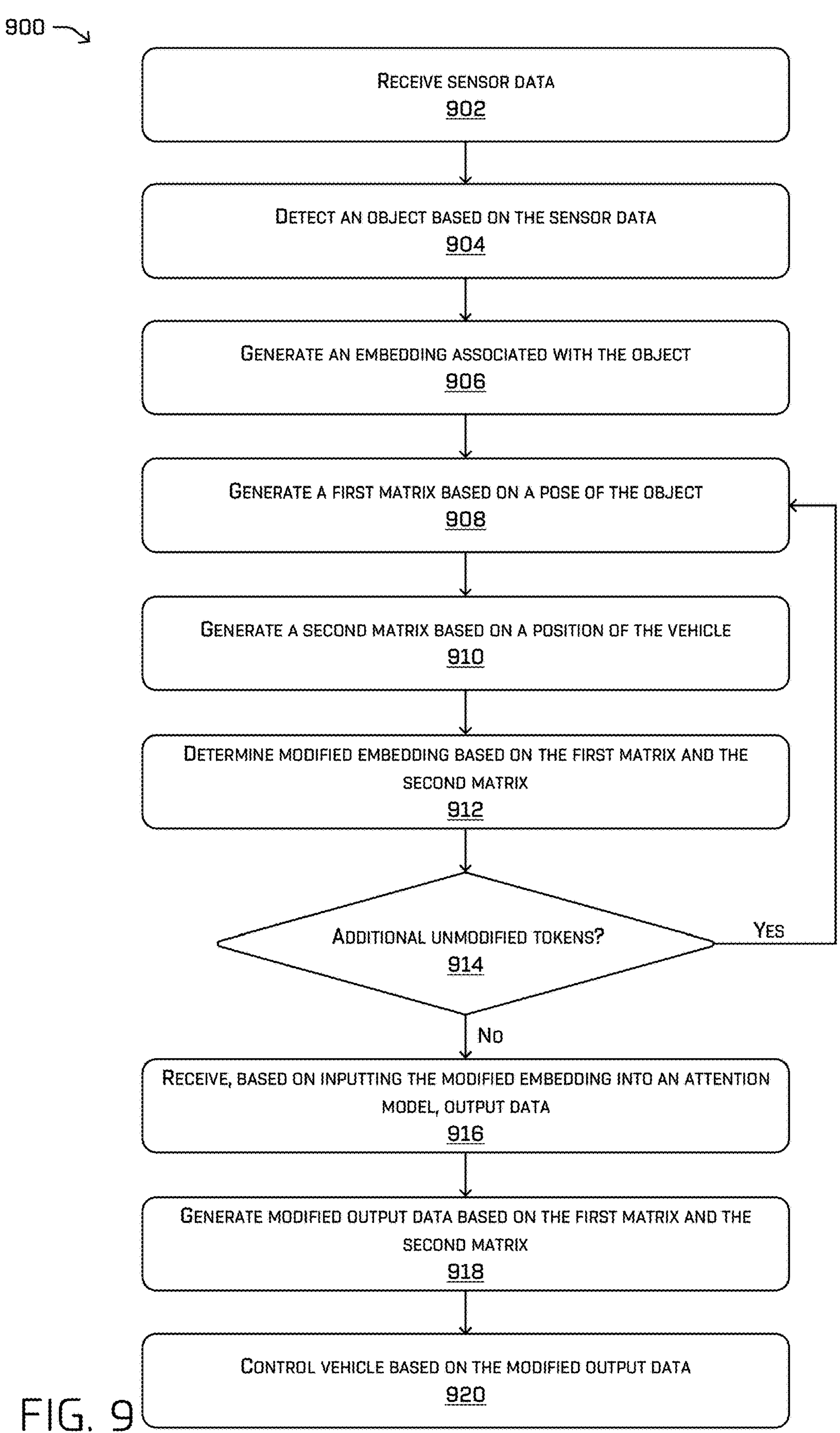
900
Receive sensor data
902
Detect an object based on the sensor data
904
Generate an embedding associated with the object
906
Generate a first matrix based on a pose of the object
908
Generate a second matrix based on a position of the vehicle
910
Determine modified embedding based on the first matrix and the second matrix
912
Additional unmodified tokens?
914
Yes
No
Receive, based on inputting the modified embedding into an attention model, output data
916
Generate modified output data based on the first matrix and the second matrix
918
Control vehicle based on the modified output data
920
FIG. 9

BEHAVIOR MODELING BASED ON RELATIVE POSITION DATA AND ABSOLUTE YAW DATA

RELATED APPLICATIONS

This application is a continuation-in-part of and claims priority to U.S. application Ser. No. 18/887,489, filed Sep. 17, 2024, the entirety of which is incorporated by reference herein for all purposes.

BACKGROUND

Vehicles, such as autonomous vehicles, may navigate along designated routes. In some examples, autonomous vehicles may encounter various types of static and/or dynamic objects within an environment. Upon detecting such objects, the vehicle may predict object trajectories and evaluate these predicted trajectories to determine future actions for the vehicle. However, in certain circumstances, techniques for determining prediction data of the object(s) in the environment can be inefficient and/or lead to inaccurate and/or misleading information which may impact the safe operation of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 9 is a flow diagram illustrating an example process for detecting an object, generating embedding data associated with the object, generating a rotation matrix based on relative lateral and/or longitudinal position data, generating updated embedding data based on the rotation matrix, receiving output data based on inputting the updated embedding data to an attention model, and controlling the vehicle based on the output data, in accordance with one or more examples of the disclosure.

DETAILED DESCRIPTION

Figure 1:
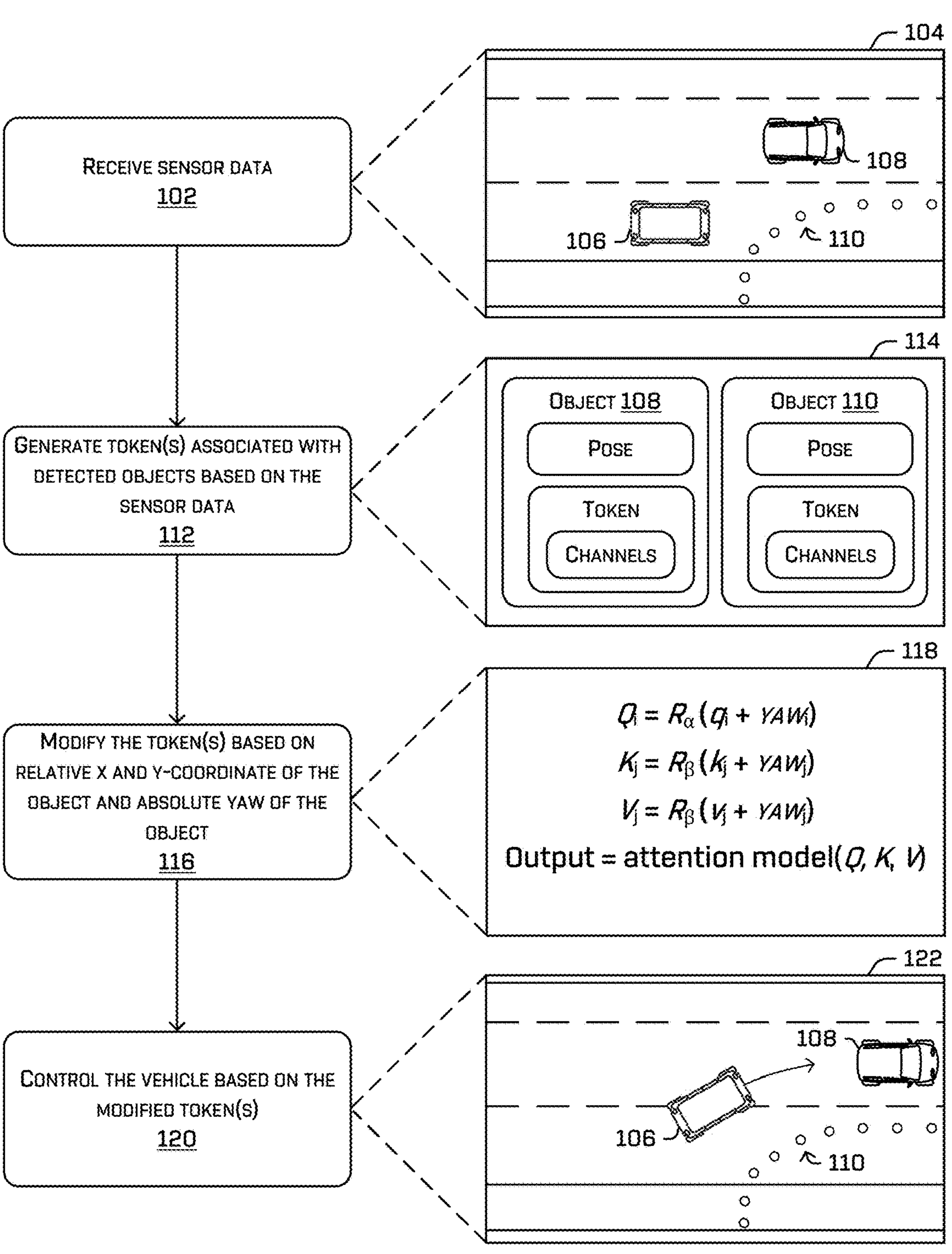
FIG. 1 is a pictorial flow diagram illustrating an example technique for modeling behavior based on relative position data and/or absolute yaw data, in accordance with one or more examples of the disclosure.

Techniques for performing prediction based on relative position data and/or absolute yaw data are described herein. In some examples, a vehicle (such as an autonomous vehicle) may detect an object in an environment. The vehicle may generate an embedding associated with the object and input the embedding into a machine-learned model. In some examples, the machine-learned model may add the absolute yaw of the object to the embedding to provide directionality to the coordinate free objects. Further, the machine-learned model may generate a rotation matrix based on the pose of the object and use the rotation matrix to modify (or rotate) the embedding. Based on modifying the embedding (or generating a modified embedding), the attention layer of the machine-learned model may perform attention on the modified embedding and provide, as output, an output feature vector. The vehicle may rotate the output feature vector (or generate rotated output data) which may be used by one or more machine-learned models to predict object behavior, generate vehicle actions, etc. As described in more detail below, the techniques described herein may improve vehicle safety and/or driving efficiency by increasing the speed at which predictions may be generated while also increasing the accuracy of such predictions, thereby allowing the vehicle to generate and/or perform safer actions.

When generating predication data for objects in an environment, it may be beneficial to increase the accuracy and/or speed of generating the prediction data while also reducing the required memory. For example, when navigating in an environment, the vehicle may encounter various objects (e.g., static and/or dynamic). In such cases, the objects may be at different locations and/or poses which may impact how the vehicle decides to progress through the environment. Accordingly, to determine an action for the vehicle, vehicle prediction systems may predict future actions of the object (s). When predicting such actions, conventional systems may include generating prediction data from the coordinate frame of each individual object (e.g., the object is the origin (e.g., (0, 0)) of the coordinate frame), from a scene coordinate frame (e.g., the vehicle is the origin), and/or from the scene coordinate frame while using relative positions of the object(s) rather than absolute positions. However, in some circumstances, generating prediction data from the coordinate frame of the object (e.g., the object being the origin) may require transforming some or all data to each individual object coordinate frame which may result in accurate prediction data but may also be slow due generating the prediction data for one object at a time, thereby consuming valuable bandwidth and computing resources. Further, generating prediction data from the scene coordinate frame may save computing resources due to being able to simultaneously generate prediction data for all objects in the shared coordinate frame but may lack precise and/or accurate prediction data. Additionally, generating prediction data using relative position data may allow the systems to be invariant to a specific coordinate frame but may also lead to inaccurate prediction data. As such, the systems and/or techniques described herein allow the prediction component to generate the prediction data using absolute yaw information (e.g., use a scene coordinate frame) while using relative position data, thereby allowing the system to increase the speed at which such predictions are generated while also increasing the accuracy of such predictions.

To address these and other technical problems and inefficiencies, the systems and/or techniques described herein include a machine-learned model component (also referred to as an "ML component") configured to generate prediction data based on leveraging relative position data and/or absolute yaw values. Technical solutions discussed herein solve one or more problems associated with inaccurate and/or suboptimal data.

In some examples, the vehicle may receive sensor data representative of an environment. That is, the vehicle may capture sensor data while navigating an environment. The vehicle may include one or more sensor device(s) (e.g., lidar device(s), radar device(s), time-of-flight device(s), image capturing device(s), etc.) located or mounted at various positions within or on the vehicle body. In such cases, the sensor device(s) may capture sensor data of the environment proximate the vehicle.

In some examples, the vehicle may detect one or more object(s) based on the sensor data. That is, the vehicle may analyze the sensor data and identify one or more object(s) within the environment. For example, the sensor data may include one or more static and/or dynamic objects such as other vehicle(s) (e.g., cars, trucks, motorcycles, cyclists, etc.), pedestrians, animals, stationary object(s) (e.g., dynamic objects that have a velocity of zero), trees, bushes, buildings, signage, road markings, etc. The vehicle may detect the object(s) using one or more machine-learned models. In some examples, the object(s) may include various types of object data (or object features) such as a classification (or type), a pose (e.g., position (e.g., x- and y-coordinate) and/or heading (or yaw)), a size, a velocity, an acceleration, a track (or history), etc. Alternatively or additionally, the vehicle may detect (or identify) the object(s) based on map data. Map data may include a representation of the static feature(s), attribute(s), and/or object(s) in the environment. As such, the vehicle may identify the object from the map data.

In some examples, the vehicle may generate a unique embedding (also referred to as a feature vector or a token) for each detected object. An embedding may be a structured form of representing data, characteristics, and/or features of the object. The vehicle may generate a single embedding (or token or feature vector) for each object. That is, if the vehicle identifies two objects, the vehicle may generate a first embedding associated with the first of the two objects and a second embedding associated with the second of the two objects. In some examples, the embedding may include one or more channels (e.g., 50, 100, 200, etc.) that are designed to contain data representing features (or object data) of the object. In this case, the embedding may include various types of data that do not depend on a coordinate frame. That is, the embedding may lack position data.

In some examples, the vehicle may generate a list of embeddings. That is, prior to inputting the embedding(s) into a machine-learned model, the vehicle may organize the embeddings in a list. For example, the list may be organized by index and as such, the vehicle may add the embeddings to the list while maintaining a mapping that indicates which object corresponds to which embedding at a certain index. For example, the vehicle may add a first embedding associated with a first object to the first index of the list, a second embedding associated with a second object to the second index of the list, etc. Accordingly, the embedding at the first index may correspond to the first object, the embedding at second index may correspond to the second object, etc. In such cases, the vehicle may maintain (or store) the mapping of object to index.

In some examples, the vehicle may input the object, the embeddings (or list of embeddings), and/or pose data into a machine-learned model. The machine-learned model may be a transformer model that includes one or more blocks or layers (or series of blocks) which may be designed to analyze and/or update the token(s). One of the layers in the machine-learned model may be an attention layer which may be configured to perform self or cross attention on the various token(s).

In some examples, the attention layer may perform the attention operations according to the relative position of the object and/or the absolute yaw of the object. That is, since determining the relative position between two objects is quadratic, the attention layer may rotate the feature vectors (e.g., embeddings) such that the dot product of the rotated feature vectors is based on the relative position. For example, the attention layer may rely on the following formula:

$$q^T R_{\beta-\alpha} k = (R_\alpha q)^T * (R_\beta k) \quad \text{Equation 1}$$

In this equation, the q may represent the queries and the k may represent the keys. As shown, the portion of the equation that recites $q^T R_{\beta-\alpha} k$ may indicate a technique to perform attention based on the relative position between the two objects. Further, the equation illustrates that $q^T R_{\beta-\alpha} k$ is the same as performing a dot product on the rotated queries and the rotated keys. As such, in the three dimensional environment within which the vehicle operates, the vehicle may perform similar operations such that the relative position data is used in the attention model. Accordingly, the attention model may perform the following equation:

$$\begin{gathered} Q_i = R_\alpha(q_i + YAW_i) \\ K_j = R_\beta(k_j + YAW_j) \\ V_j = R_\beta(v_j + YAW_j) \\ \text{Output} = \text{attention model}(Q, K, V) \end{gathered} \quad \text{Equation 2}$$

In this example, the $R_\alpha$ may represent a rotation matrix that is generated based on the pose of the object. Further, the $q_i$ may represent the query token at index i in the token list, $k_j$ may represent the key token at index j in the token list, and $v_j$ may represent the value token at index j in the token list, and $YAW_i$ may represent the absolute yaw of the object. Accordingly, $Q_i$ may represent the rotated query token, $K_j$ may represent the rotated key token, and $V_j$ may represent the rotated value token. In such cases, the rotated tokens may be input to the attention model which may perform a dot product operation on such rotated tokens.

For example, the attention model may generate rotation matrices (e.g., 2-dimensional rotation matrices) based on the pose(s) of the object(s). The rotation matrix may be a product of the x-coordinate, the y-coordinate, and/or the yaw scaled to different amounts. For example, the attention model may identify the x-coordinate and/or the y-coordinate of an object and generate a rotation matrix based on the x and/or y coordinates. The rotation matrix may be:

$$M(\theta) = \begin{bmatrix} \cos\theta & -\sin\theta \\ \sin\theta & \cos\theta \end{bmatrix} \quad \text{Equation 3}$$

In this equation, M(o) may represent the rotation matrix. As such, the rotation matrix may be a rotation by an angle multiplied by the x- or y-coordinate of the object. In some cases, the attention model may generate multiple different rotation matrices for a single object. That is, the attention model may generate rotation matrices using the x-coordinate, the y-coordinate, the yaw, and/or a timestamp of the received data. Accordingly, each token may have one or more corresponding rotation vectors that correspond to the object pose. For example, the attention model may generate a first rotation matrix using the pose of a first object, a second rotation matrix using the pose of a second object, etc. In this example, the feature vector at the first index corresponds to the first object and as such, the first rotation matrix corresponds to the feature vector at the first index. Further, the feature vector at the second index may correspond to the second object and as such, the second rotation matrix corresponds to the feature vector at the second index.

In some examples, the attention model may update (or rotate) the feature vectors (or tokens) by applying the associating rotation matrices to the feature vectors. That is, after adding the absolute yaw to the feature vector, the attention model may use the rotation matrices to update (or rotate) the feature vectors. As noted above, the feature vector (or embedding) may include multiple different channels that contain data representing feature(s) of the object. Accordingly, when rotating the feature vector, the attention model may discretize (or chunk) the feature vector into one or more groups of feature vectors. Specifically, the attention model can discretize the feature vector into sub-feature vectors of two channels. For example, if the feature vector includes 50 channels, the attention model may determine 25 sub-feature vectors from the single feature vector-two channels per sub-feature vector (e.g., 1×2 matrix).

Based on discretizing the feature vector, the attention model may rotate the sub-feature vectors based on the rotation matrix. That is, the attention model may apply the rotation matrix to the first sub-feature vector which may result in a rotated sub-feature vector. The attention model may perform such operations to some or all the remaining sub-feature vectors.

Based on rotating the sub-feature vectors, the attention model may concatenate the rotated sub-feature vectors into a single rotated feature vector. That is, the attention model may cause the rotated sub-feature vectors to combine into a single feature vector. Continuing the example from above, the attention model may combine the 25 rotated sub-feature vectors into a single rotated feature vector. In some examples, the attention model may perform such operations to some or all feature vectors in the list of feature vectors (or to the list of embeddings).

In some examples, the attention model may perform self and/or cross attention on the rotated feature vectors. The attention model may be a traditional attention model, a flash attention model, etc. The attention model may update or modify the rotated feature vectors and provide output data. That is, the attention model may receive, as input, the rotated feature vectors and provide, as output, output data (or an output feature vector).

In some examples, the attention model may rotate the output feature vector. The purpose of rotating the output feature vector is because such a rotation may provide depth information to the vehicle and/or other machine-learned models. As such, the machine-learned model may perform similar rotation operations on the output feature vector as were performed on the initial embeddings. For example, the machine-learned model may discretize the output feature vector into sub-feature vectors, rotate the sub-feature vectors by applying the rotation matrices to the sub-feature vectors, and/or concatenating the rotated sub-feature vectors into a single output feature vector.

In some examples, the vehicle may use the rotated output feature vector to control the vehicle. After receiving the output token(s) (e.g., rotated output feature vectors), the machine-learned model may send the output token(s) to one or more subsequent layers within the network. Further, after passing through the whole network, the data may be sent and/or used to predict object data, classify a driving scene, generate vehicle actions, etc.

Additionally or alternatively, the vehicle may determine the rotation matrix based on relative lateral and longitudinal positions between objects. That is, in some cases, it may be important for a vehicle to understand the position of the object relative to the vehicle. For example, the vehicle may perform different actions based on the object being in front of the vehicle, behind the vehicle, or on the side of the vehicle. As such, the vehicle may generate rotation matrices based on angle(s) derived from the lateral and longitudinal positions between objects that can be used to rotate (or modify) the object embedding(s).

As described in more detail below, the vehicle may determine a first rotation matrix based on the relative lateral position between objects and a separate (or second) rotation matrix based on the relative longitudinal position between the objects. In such cases, the vehicle may rotate (or modify) a first sub-feature vector using the first rotation matrix while rotating (or modifying) a second (or subsequent) sub-feature vector using the second rotation matrix. That is, a first subset (e.g., less than all) of the sub-feature vectors may be rotated (or modified) by a rotation matrix based on relative longitudinal values whereas a second subset of the sub-feature vectors for the same embedding may be rotated (or modified) by a rotation matrix based on relative lateral values. For example, the vehicle may perform such operations by performing the following formula:

$$[q_1\ q_2] * \varphi(r_x) * \begin{bmatrix} k_1 \\ k_2 \end{bmatrix} \quad \text{Equation 4}$$

In this equation, the $[q_1\ q_2]$ may represent a sub-feature vector of the queries. Further, the $$\begin{bmatrix} k_1 \\ k_2 \end{bmatrix}$$

may represent a sub-feature vector of the keys. In some cases, the queries and the keys may correspond to the same or different object(s). The $\varphi(r_x)$ may represent a rotation matrix based on a longitudinal relative position (e.g., $r_x$). As such, in this example, the vehicle may rotate (or modify) the sub-feature vectors based on the rotation matrix that is determined based on the relative longitudinal position. That is, as described in more detail below, instead of determining a rotation matrix based on the difference in the global x-coordinates of the object (as described above), the vehicle may determine the rotation matrix based on the longitudinal difference in the object body frames. Further, in addition to rotating a first subset of the sub-feature vectors by the relative longitudinal position-based rotation matrix, the vehicle can rotate a second subset of the sub-feature vectors by the relative lateral position-based rotation matrix by performing the formula below:

$$[q_3\ q_4] * \varphi(r_y) * \begin{bmatrix} k_3 \\ k_4 \end{bmatrix} \quad \text{Equation 5}$$

In some examples, the $[q_3\ q_4]$ may represent a sub-feature vector of queries that are different than the sub-feature vector of queries described above in Equation 4. The $$\begin{bmatrix} k_3 \\ k_4 \end{bmatrix}$$

may represent a sub-feature vector of keys that are different than the sub-feature vector of keys described above in Equation 4. Further, the $\varphi(r_y)$ may represent a rotation matrix based on a lateral relative position (e.g., $r_y$). As such, in this example, the vehicle may rotate (or modify) the sub-feature vectors based on the rotation matrix based on the relative lateral position.

In some examples, the vehicle may determine the rotation matrices based on relative lateral and/or longitudinal data of object(s) within the environment. In some examples, a rotation matrix, such as $\varphi(r_x)$, may be a result of one or more other matrices. For example, when determining $\varphi(r_x)$, the vehicle may solve the equation below:

$$\varphi(r_x) = \emptyset^q * \emptyset^k \quad \text{Equation 6}$$

In this equation, the $\emptyset^q$ may represent a matrix that can be determined based on the pose of a first object. The $\emptyset^k$ may represent a matrix that can be determined based on the pose of a second (and different) object. In some examples, the vehicle may determine $\emptyset^q$ and $\emptyset^k$ and combine such matrices to result in a single rotation matrix, $\varphi(r_x)$. However, in other examples, the vehicle may use $\emptyset^q$ and $\emptyset^k$ to rotate (or modify) the embeddings. That is, the vehicle may use $\emptyset^q$ to rotate (or modify) the query sub-feature vector and $\emptyset^k$ to rotate (or modify) the key sub-feature vector. In some examples, the vehicle may perform the equations below to determine the matrices $\emptyset^q$ and $\emptyset^k$ $$\emptyset^q = \varphi(v_x) * \begin{bmatrix} b^T & 0 \\ 0 & b^T \end{bmatrix}$$

In this equation, the $\varphi(v_x)$ may represent a first matrix that can be determined based on the position of the first object. That is, $\varphi(v_x)=(-x_i \cos(\emptyset)_i - y_i \sin(\emptyset)_i)$ where $x_i$, $y_i$, and $\emptyset_i$ represent the x-coordinate, the y-coordinate, and the heading of the first object. Accordingly, the vehicle may determine $\varphi(v_x)$ by using the position and/or heading of the first object. In some examples, the $b^T$ may be a vector as represented by $[g_0, g_1, g_2, \ldots, g_n]$ where g alternates between $\sin(\theta)$, $\text{cosine}(\theta)$, $\sin(2\theta)$, $\text{cosine}(2\theta)$, etc. (e.g., determine the sine and cosine of the first object heading using one or more different multipliers). In this example, the theta may be the heading of the first object. That is, the second matrix (e.g., $$\begin{bmatrix} b^T & 0 \\ 0 & b^T \end{bmatrix}$$

associated with $\emptyset^q$ may be determined based on the heading of the first object. As noted above, the first and second matrices of $\emptyset^q$ may be based on the position and heading of the first object whereas the matrix associated with $\emptyset^k$ may be based on a second and different object.

$$\emptyset^k = \begin{bmatrix} w_c & -w_s \\ w_s & w_c \end{bmatrix} \quad \text{Equation 8}$$

In this equation, the $\emptyset^k$ may be based on the pose (or position) of a second object that is different than the first object used to determine $\emptyset^q$. As noted above, the $\emptyset^q$ may represent a third matrix. In this example, the values within the third matrix may be values or vectors. As an example, $w_c$ may be a vector $[a_0, a_1, a_2, \ldots, a_n]^T$ where $a_n$ is defined by:

$$a_n = \frac{c_n}{2\pi} \int_{-\pi}^{\pi} \cos(x_j \cos(z) + y_j \sin(z)) g_n dz \quad \text{Equation 9}$$

In this equation, $a_n$ may be the sum of the $g_n$ which may alternate between sine and cosine. The vehicle may perform Equation 9 to determine the vector $w_c$ which may be used in the matrix $\emptyset^k$. Further, the matrix $\emptyset^k$ may include $w_s$ which may be a vector $[a_0, a_1, a_2, \ldots, a_n]^T$ where an is defined by:

$$a_n = \frac{c_n}{2\pi} \int_{-\pi}^{\pi} \sin(x_j \cos(z) + y_j \sin(z)) g_n dz \quad \text{Equation 10}$$

That is, a primary difference between determining $w_c$ and $w_s$ may be summing a sine in Equation 10 rather than a cosine in Equation 9. In such cases, upon determining the matrix $\emptyset^k$ and the matrix $\emptyset^q$, the vehicle may rotate (or modify) the queries and/or keys as shown in Equation 5. That is, the attention model may apply the rotation matrix $\varphi(r_y)$ or $\emptyset^k$ and $\emptyset^q$ to the first sub-feature vector which may result in a rotated sub-feature vector. The attention model may perform such operations to some or all of the remaining sub-feature vectors.

Based on rotating (or modifying) the sub-feature vectors, the attention model may concatenate the rotated (or modified) sub-feature vectors into a single rotated (or modified)

feature vector. That is, the attention model may cause the rotated (or modified) sub-feature vectors to combine into a single feature vector. Similar to the techniques described above, the attention model may combine the 25 rotated sub-feature vectors into a single rotated (or modified) feature vector.

In some examples, the attention model may perform self- or cross-attention on the rotated (or modified) feature vectors. The attention model may be a traditional model, a flash attention model, etc. The attention model may update or modify the rotated feature vectors and provide output data. That is, the attention model may receive, as input, the rotated (or modified) feature vectors and provide, as output, output data (or an output feature vector). That is, in some cases, the input to the attention model may be the modified feature vector(s) associated with one or more different object(s).

In some examples, the attention model may rotate the output feature vector. The purpose of rotating (or modifying) the output feature vector is because such a rotation may provide depth information to the vehicle and/or other machine-learned models. As such, the machine-learned model may perform similar rotation operations on the output feature vector as were performed on the initial embeddings. For example, the machine-learned model may discretize the output feature vector into sub-feature vectors, rotate (or modify) the sub-feature vectors by applying $\varphi(r_y)$, $\varphi(r_x)$, $Ø^k$, and/or $Ø^q$ to the sub-feature vectors, and/or concatenate the rotated (or modified) sub-feature vectors into a single output feature vector.

In some examples, the vehicle may use the rotated (or modified) output feature vector to control the vehicle. Similar to the above, after receiving the output token(s) (e.g., rotated output feature vectors), the machine-learned model may send the output token(s) to one or more subsequent layers within the network. Further, after passing through the whole network, the data may be sent and/or used to predict object data, classify a driving scene, generate vehicle actions, etc.

The techniques described herein can improve the functioning, safety, and efficiency of the autonomous and semi-autonomous vehicles operating in various driving environments. Utilizing relative object data may result in decreased latency when generating prediction data as well as an increased accuracy in the prediction data. The decreased latency may allow the vehicle to analyze the driving scene quicker which may lead to the vehicle generating and/or following more accurate and safer vehicle actions. Further, such techniques may increase the ability to scale determining positions and/or pose data of object(s) within a driving environment. Such techniques may enable such benefits due to operating and/or consuming memory in a linear manner rather than quadratically. These benefits may reduce the GPU load during navigation and/or while training models. Further, in some cases, the techniques described herein may increase the ability to determine accurate and/or efficient driving maneuvers by providing the vehicle information as to whether the object(s) are behind the vehicle, in front of the vehicle, or on the side of the vehicle.

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for modeling behavior based on relative position data and/or absolute yaw data. As shown in this example, some or all of the operations in the example process 100 may be performed by a machine-learned model component, a perception component, a prediction component, a planning component, and/or any other component or system within an autonomous vehicle.

At operation 102, the vehicle may receive sensor data. In some examples, the vehicle may use one or more sensor devices to capture sensor data while navigating through an environment. That is, the vehicle may include various types of sensor devices and/or sensor modalities located or mounted at various portions on or in the vehicle. The vehicle may use the sensor data to detect objects in the environment. For example, box 104 illustrates the vehicle 106 capturing sensor data of an object 108 and an object 110. In this example, the vehicle 106 may be navigating in a first driving lane and the object 108 may be navigating in a laterally adjacent driving lane. As shown, the object 108 may be a vehicle; however, in other examples, the object 108 may be any other type of dynamic or static object. Further, the object 110 may be construction cones. In this example, the vehicle 106 may analyze the sensor data to identify one or more features of the objects such as velocity, classification, pose, etc.

At operation 112, the vehicle may generate token(s) associated with the detected objects based on the sensor data. As noted above, the vehicle 106 may detect one or more objects in the environment. The vehicle 106 may generate a token (e.g., feature vector or embedding) for each object in the environment. For example, box 114 illustrates token(s) for the object 108 and for the object 110. In this example, box 114 includes a table for the object 108 and a separate table for the object 110. The table for the object 108 may include a pose of the object 108 and a token of the object. As shown, the token associated with the object 108 may include one or more channels which may include data that represents features of the object 108. Further, the table for the object 110 may include a pose of the object 110 and a token of the object 110. As shown, the token associated with the object 110 may include one or more channels which may include data that represents features of the object 110.

At operation 116, the vehicle may modify the token(s) based on relative x- and y-coordinates of the object and an absolute yaw of the object. That is, the vehicle may include a machine-learned model that may include an attention layer which may perform attention operations on the tokens. However, prior to performing attention on the tokens, the vehicle may rotate the tokens and input the rotated tokens into the attention layer (or model). For example, box 118 illustrates formulas that, when performed, allow the attention model to operate on the relative position data and/or the absolute yaw data. In this example, the formulas included in box 118 may be the same as Equation 2. Accordingly, the vehicle may add the absolute yaw of the object 108 to the object 108 token, rotate the token, and input the rotated token into the attention model. Further, the vehicle may add the absolute yaw of the object 110 to the object 110 token, rotate the token, and input the rotated token into the attention model. Additional description regarding rotating the tokens (or feature vectors) is described in FIGS. 2-4.

At operation 120, the vehicle may be controlled based on the modified token(s). That is, based on performing attention on the rotated tokens, the attention model may provide, as output, an output token. The vehicle may rotate the output token using similar or identical techniques as described in operation 116. Based on rotating the output token, the vehicle may use the rotated output token to generate prediction data, generate vehicle actions, etc. For example, box 122 illustrates the vehicle performing a lane change maneuver based on prediction data generated using the rotated output data. In this example, the vehicle may use the rotated output data to predict the movements of the object 108 and/or the object 110. In this case, the vehicle planning component may use the prediction data to determine that the vehicle is to lane change such that the vehicle 106 progress is not impeded by the object 110.

Figure 2:
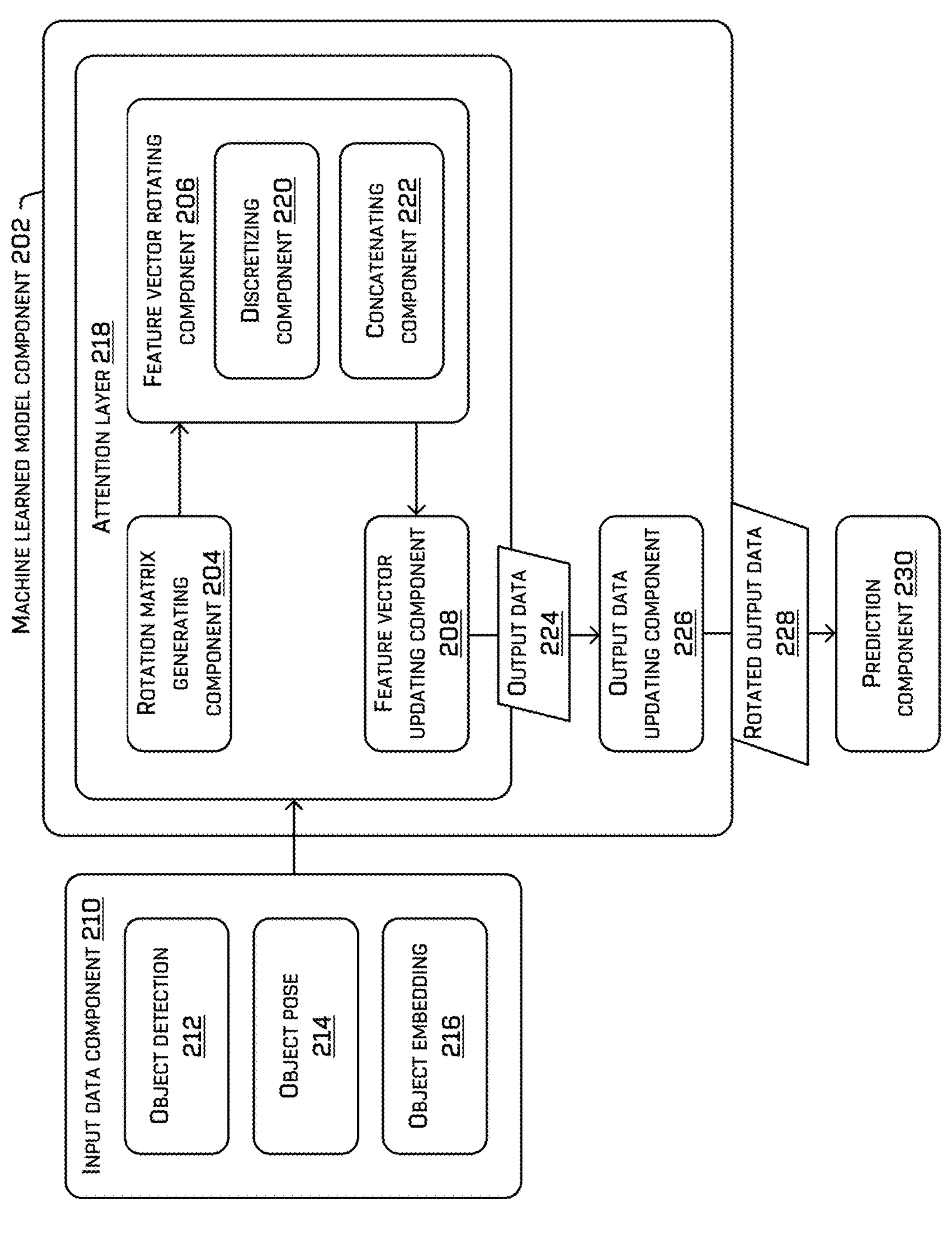
FIG. 2 illustrates an example computing system including a machine-learned model component configured to generate rotated attention model output data based on relative position data, in accordance with one or more examples of the disclosure.

FIG. 2 illustrates an example computing system 200 including a machine-learned model component 202 configured to generate rotated attention model output data based on relative position data.

In some examples, the machine-learned model component 202 may be similar or identical to the machine-learned model component described above, or in any other examples herein. As noted above, in some cases the machine-learned model component 202 may be implemented within an autonomous vehicle. In some examples, the machine-learned model component 202 may include various components, described below, configured to perform different functionalities of a technique to perform prediction using relative position data and/or absolute yaw data. In some examples, the machine-learned model component 202 may include a rotation matrix generating component 204 configured to generate rotation matrices, a feature vector rotating component 206 configured to rotate feature vector(s) associated with object(s), and/or a feature vector updating component 208 configured to update the rotated feature vector based on an attention model.

In some examples, the machine-learned model component 202 may receive input data from an input data component 210. As shown, the input data component 210 may include one or more sub-components which may include an object detection component 212, an object pose component 214, and/or an object embedding component 216. The object detection component 212 may include data associated with a detected object. For example, the object data may include velocity data, acceleration data, track data, classification data, state data, etc. The object pose component 214 may include an absolute pose (e.g., position and/or heading (or yaw)) of the object in the object detection component 212. The absolute pose may align with a global or local frame of reference. The object embedding component 216 may include an embedding (e.g., feature vector or token) associated with a specific object in the object detection component 212. As noted above, the embedding may include one or more channels which may include data representative of features or characteristics of the object. As shown, the machine-learned model component 202 may receive the input data from the input data component 210.

As shown, the machine-learned model component 202 may include an attention layer 218. In some examples, the machine-learned model component 202 may include one or more blocks or layers (e.g., series of layers). In this example, the machine-learned model component 202 may include at least one attention layer 218 (or flash attention layers). However, in other examples, the machine-learned model component 202 may include more than one attention layer. Further, FIG. 2 illustrates that the attention layer 218 includes multiple sub-components; however, in other examples, the sub-components may be located external to the attention layer 218. As shown, the attention layer 218 may include the rotation matrix generating component 204, the feature vector rotating component 206, and/or the feature vector updating component 208.

In some examples, the machine-learned model component 202 may include a rotation matrix generating component 204 configured to generate rotation matrices. The rotation matrix generating component 204 may receive the input data from the input data component 210. In some examples, the rotation matrix generating component 204 may generate one or more rotation matrices based on the pose of the object. That is, the rotation matrix may be a product of the x-coordinate or the y-coordinate scaled different amounts. In some examples, the rotation matrix generating component 204 may generate a unique rotation matrix for each object based on the specific pose of the object. Of course, in some cases, the rotation matrix generating component 204 may generate multiple rotation matrices for some or all objects. The rotation matrix generating component 204 may send the rotation matrices to the feature vector rotating component 206.

In some examples, the machine-learned model component 202 may include a feature vector rotating component 206 configured to rotate feature vector(s) associated with object (s). The feature vector rotating component 206 may receive the rotation matrices and/or any other input data from the input data component 210. The feature vector rotating component 206 may modify the object embedding (or feature vector) based on applying the rotation matrix that corresponds to the same object as the feature vector with the feature vector. When rotating the feature vector, a discretizing component 220 may discretize the feature vector into one or more sub-feature vectors. That is, the discretizing component 220 may generate sub-feature vectors that include two (or more) channels of the original feature vector. Based on generating the sub-feature vectors, the feature vector rotating component 206 may apply the rotation matrix to each of the sub-feature vectors which may result in rotated (or modified) sub-feature vectors.

Based on rotating the sub-feature vectors, the concatenating component 222 of the feature vector rotating component 206 may concatenate the rotated sub-feature vectors into a single rotated feature vector. That is, the concatenating component 222 may combine some or all of the rotated sub-feature vectors into a single rotated feature vector. Additional description regarding rotating the feature vector may be discussed in FIGS. 3 and 4.

In some examples, the machine-learned model component 202 may include a feature vector updating component 208 configured to update the rotated feature vector based on an attention model. In such cases, the feature vector updating component 208 may receive the rotated feature vector from the feature vector rotating component 206. The feature vector updating component 208 may input the rotated feature vector into the attention layer 218 (or model) such that the attention layer 218 may perform self and/or cross attention on the rotated feature vector. Based on performing attention on the rotated feature vector, the attention layer 218 may provide, as output, an output feature vector 224. The feature vector updating component 208 may send the output feature vector 224 to an output data updating component 226.

In some examples, the output data updating component 226 may rotate the output feature vector 224. That is, the output data updating component 226 may perform similar or identical operations as discussed in the feature vector rotating component 206 on the output feature vector 224. The output data updating component 226 may apply the rotation matrix determined by the rotation matrix generating component 204 to the output feature vector 224. The output data updating component 226 may send the rotated output feature vector 228 to one or more prediction components 230. The prediction components 230 may use the rotated output feature vector 228 to generate prediction data.

Figure 3:
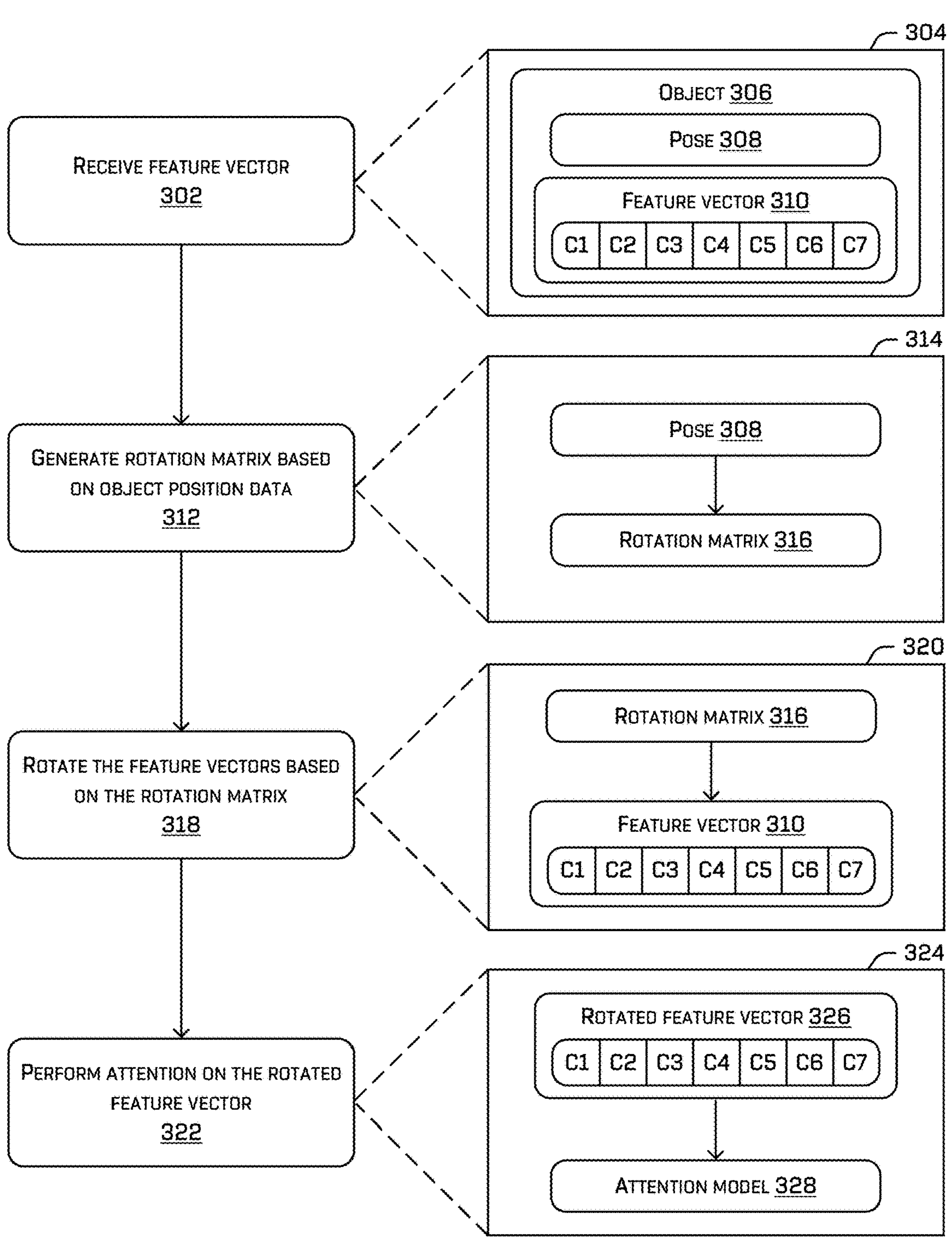
FIG. 3 is a pictorial flow diagram illustrating an example technique for generating rotated feature vectors and/or performing attention on the rotated feature vector(s), in accordance with one or more examples of the disclosure.

FIG. 3 is a pictorial flow diagram illustrating an example process 300 for generating rotated feature vectors and/or performing attention on the rotated feature vector(s). As shown in this example, some or all of the operations in the example process 300 may be performed by a machine-learned model component, a perception component, a prediction component, a planning component, and/or any other component or system within an autonomous vehicle.

At operation 302, the vehicle may receive a feature vector. In some examples, a vehicle may capture sensor data while navigating through an environment. The vehicle may use the sensor data to detect objects proximate the vehicle. Further, the vehicle may use the sensor data to determine or otherwise identify one or more characteristics and/or features associated with the object such as a pose, a velocity, a classification, a state, etc. In some cases, the vehicle may generate an embedding (or feature vector) associated with the vehicle. For example, the box 304 illustrates object data that includes a pose and/or a feature vector. In this example, box 304 includes a detection of an object 306. The object 306 may be any dynamic, static, or stationary object. As shown, the box 304 may include a pose 308 of the object 306. The pose 308 may include an x-coordinate, a y-coordinate, and/or a heading (or yaw). The pose 308 may be based on a global or local frame of reference. Further, the box 304 may include a feature vector 310 that is associated with the object 306. As shown, the feature vector 310 may include multiple channels. Specifically, the feature vector 310 may include seven channels. However, this is not intended to be limiting; in other examples, the feature vector 310 may have more or fewer channels. As noted above, each channel may contain data associated with or corresponding to a feature or characteristic of the object 306.

At operation 312, the vehicle may generate one or more rotation matrices based on the object 306 pose 308. That is, the vehicle may input the feature vector 310 into a machine-learned model. The machine-learned model may include an attention layer (or model) which may perform self and/or cross attention. In such case, prior to inputting the feature vector 310 into the attention model, the vehicle may rotate the feature vector 310. To rotate the feature vector 310, the vehicle may generate a rotation matrix and apply the rotation matrix to the feature vector 310. For example, box 314 illustrates generating a rotation matrix 316. In this example, the box 314 illustrates the pose 308 of the object 306 being applied to a rotation matrix as discussed with respect to Equation 3. In some cases, the rotation matrix 316 may be a product of the x- and/or y-coordinates. Additionally or alternatively, the rotation matrix 316 may also be a product of the absolute yaw of the object 306. Though box 314 illustrates a single rotation matrix 316 associated with the object 306, in other examples, the vehicle may generate multiple different rotation matrices.

At operation 318, the vehicle may rotate the feature vector 310 based on the rotation matrix 316. As noted above, the vehicle may perform the techniques described in Equation 2 such that the operations are performed with relative position data and/or absolute yaw. As such, the vehicle may rotate the queries, keys, and/or values which may lead to the vehicle rotating the feature vector 310. For example, box 320 may illustrate applying the rotation matrix 316 to the feature vector 310. When rotating (or modifying) the feature vector 310, the vehicle may discretize the feature vector 310 into one or more sub-feature vectors. That is, the feature vector 310 may be discretized into sub-feature vectors that include two or more channels. In such cases, based on generating the sub-feature vectors, the vehicle may rotate the sub-feature vectors based on the rotation matrix 316. In such cases, based on rotating the sub-feature vectors, the vehicle may concatenate (or combine) the rotated sub-feature vectors into a single rotated feature vector. Additional description regarding rotating the feature vector 310 may be found in FIG. 4.

At operation 322, the vehicle may perform attention on the rotated feature vector 326. That is, based on rotating the feature vector 310, the vehicle may input the rotated feature vector into an attention model such that the attention model may perform attention operations on the rotated feature vector. For example, box 324 illustrates inputting the rotated feature vector 326 into an attention model 328. In this example, box 324 includes a rotated feature vector 326 which may be the rotated feature vector as determined at operation 318. Further, the box 324 includes an attention model 328 which may be a layer of a transformer model. However, in some examples, the attention model 328 may be a standalone model. In this example, box 324 illustrates the rotated feature vector 326 into the attention model 328. Accordingly, the attention model 328 may perform attention operations on the rotated feature vector 326 and output an output feature vector. The output feature vector may be used to control the vehicle.

Figure 4:
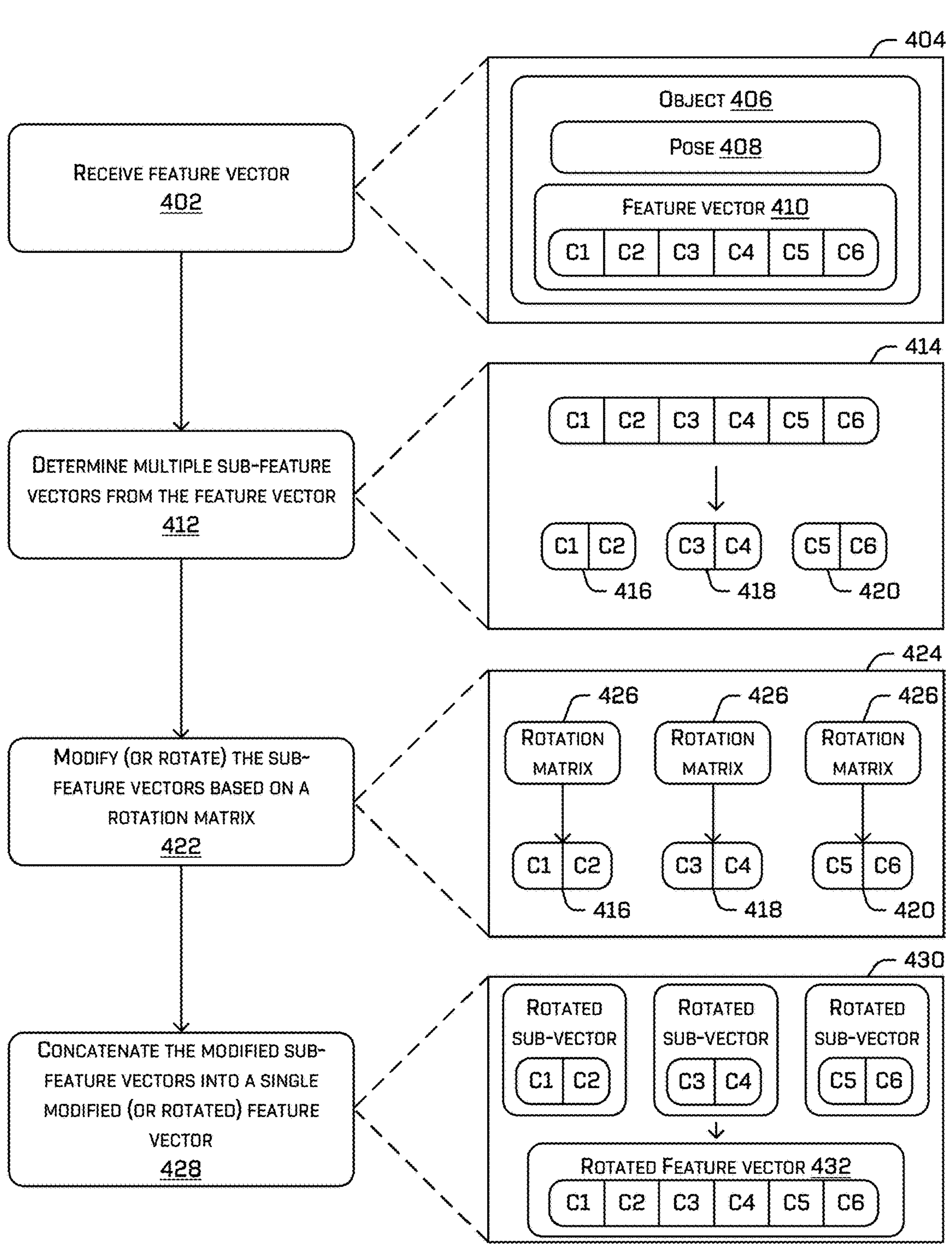
FIG. 4 is a pictorial flow diagram illustrating an example technique for discretizing a feature vector into multiple sub-feature vectors, rotating the multiple sub-feature vectors, and/or generating a single rotated feature vector based on the multiple rotated sub-feature vectors, in accordance with one or more examples of the disclosure.

FIG. 4 is a pictorial flow diagram illustrating an example process 400 for discretizing a feature vector into multiple sub-feature vectors, rotating the multiple sub-feature vectors, and/or generating a single rotated feature vector based on the multiple rotated sub-feature vectors. As shown in this example, some or all of the operations in the example process 400 may be performed by a machine-learned model component, a perception component, a prediction component, a planning component, and/or any other component or system within an autonomous vehicle.

At operation 402, the vehicle may receive a feature vector. In some examples, a vehicle may capture sensor data while navigating through an environment. The vehicle may use the sensor data to detect objects proximate the vehicle. Further, the vehicle may use the sensor data to determine or otherwise identify one or more characteristics and/or features associated with the object such as a pose, a velocity, a classification, a state, etc. In some cases, the vehicle may generate an embedding (or feature vector) associated with the vehicle. For example, the box 404 illustrates object data that includes a pose and/or a feature vector. In this example, box 404 includes a detection of an object 406. The object 406 may be any dynamic, static, or stationary object. As shown, the box 404 may include a pose 408 of the object 406. The pose 408 may include an x-coordinate, a y-coordinate, and/or a heading (or yaw). The pose 408 may be based on a global or local frame of reference. Further, the box 404 may include a feature vector 410 that is associated with the object 406. As shown, the feature vector 410 may include multiple channels. Specifically, the feature vector 410 may include six channels. However, this is not intended to be limiting; in other examples, the feature vector 410 may have more or fewer channels. As noted above, each channel may contain data associated with or corresponding to a feature or characteristic of the object 406.

At operation 412, the vehicle may discretize the feature vector into a plurality of sub-feature vectors. That is, the vehicle may input the feature vector 410 into a machine-learned model. The machine-learned model may include an attention layer (or model) which may perform self and/or cross attention. In such case, prior to inputting the feature vector 410 into the attention model, the vehicle may rotate the feature vector 410. To rotate the feature vector 410, the vehicle may generate a rotation matrix and apply the rotation matrix to the feature vector 410. However, in some cases, the vehicle may discretize (or chunk) the feature vector 410 prior to applying the rotation matrix to the feature vector 410. For example, box 414 illustrates the channels of the feature vector 410 grouped into multiple sub-feature vectors. In this example, the vehicle may group the feature vector 410 into sub-vectors with two channels. For example, box 414 illustrates a sub-feature vector 416 that includes channel one and channel two from the feature vector 410, sub-feature vector 418 that includes channel three and channel four from the feature vector 410, and sub-feature vector 420 that includes channel five and channel six from the feature vector 410. However, in other examples, the vehicle may group the channels in non-sequential order (e.g., channel 1 is grouped with channel 5).

At operation 422, the vehicle may modify (or rotate) the sub-feature vectors based on a rotation matrix. As described above, the vehicle may generate a rotation matrix based on the pose 408 of the object 406. Based on generating the rotation matrix and the one or more sub-feature vectors, the vehicle may rotate the sub-feature vectors based on applying the rotation matrix to the sub-feature vectors. For example, box 424 illustrates modifying the sub-feature vectors. In this example, the box 424 includes the rotation matrix 426 that is associated with the object 406. In this case, the vehicle may apply the rotation matrix 426 to some or all sub-feature vectors. For example, box 424 illustrates applying the rotation matrix 426 to the sub-feature vector 416 which may result in a rotated (or modified) sub-feature vector, the rotation matrix 426 to the sub-feature vector 418 which may result in a rotated (or modified) sub-feature vector, and the rotation matrix 426 to the sub-feature vector 420 which may result in a rotated (or modified) sub-feature vector. Of course, in some examples, the rotation matrix 426 being applied to the sub-feature vector 416 may be the same or different rotation matrix as the rotation matrix 426 being applied to the sub-feature vector 418.

At operation 428, the vehicle may concatenate the modified sub-feature vectors into a single modified (or rotated) feature vector. That is, the vehicle may combine the multiple rotated sub-feature vectors into a single rotated feature vector. For example, box 430 illustrates concatenating the rotated sub-feature vectors. In this example, the box 430 illustrates a rotated sub-feature vector that includes the first and second channel, a rotated sub-feature vector that includes the third and fourth channel, and a rotated sub-feature vector that includes the fifth and sixth channel. Of note, the rotated sub-feature vectors may be distinct and/or separate feature vectors. Accordingly, the box 430 illustrates combining the rotated sub-feature vectors into a single rotated feature vector 432. The rotated feature vector 432 may be a rotated version of the feature vector 410 of the object 406. As discussed above and throughout, the vehicle may input the rotated feature vector 432 into an attention model. The attention model may provide, as output, an output feature vector. In such cases, the vehicle may perform similar or identical operations as described in FIG. 4 to rotate the output feature vector. The rotated output feature vector may be used to generate prediction data, evaluate a driving scene, etc.

Figure 5:
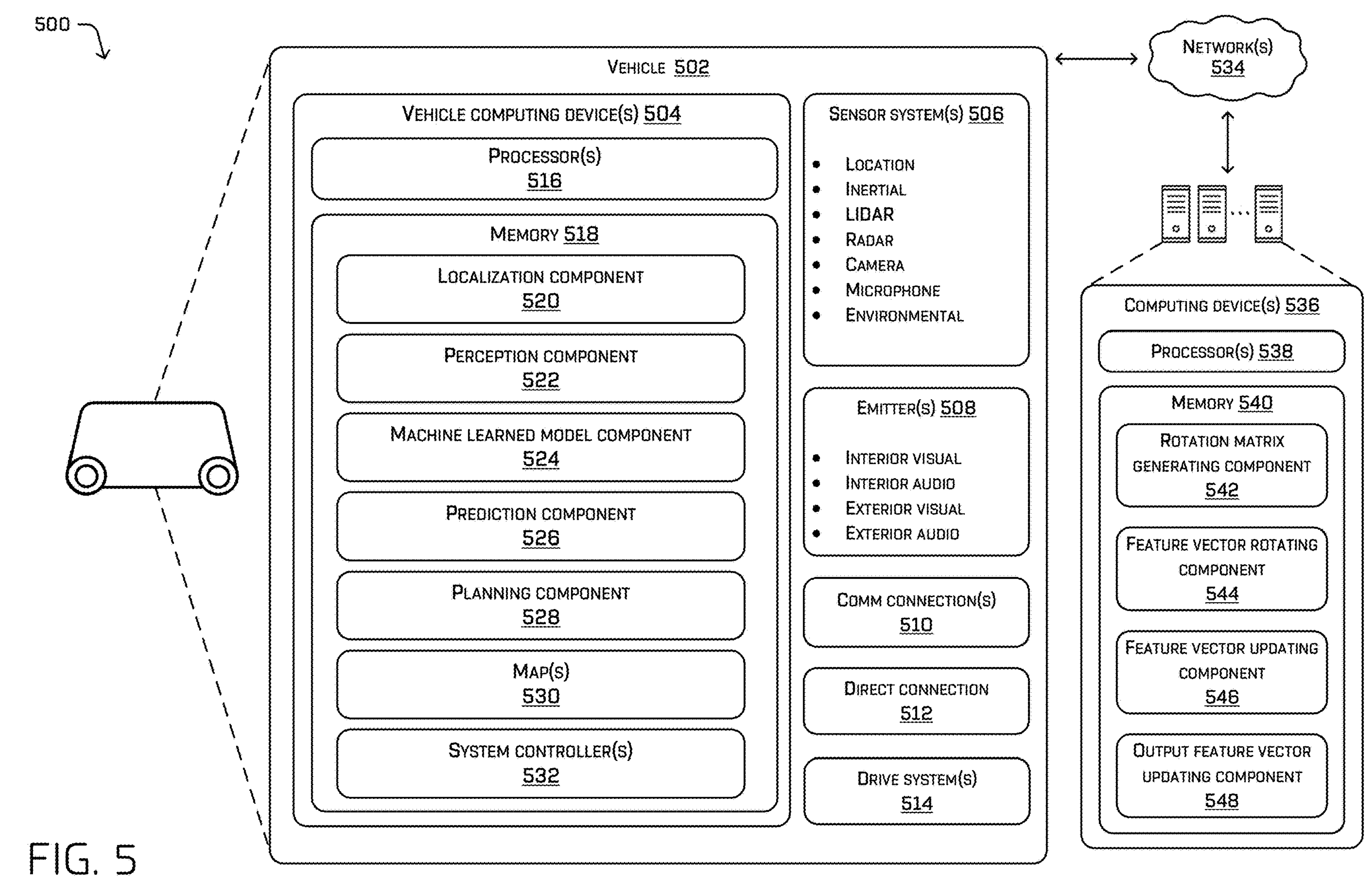
FIG. 5 depicts a block diagram of an example system for implementing various techniques described herein.

FIG. 5 is a block diagram of an example system 500 for implementing the techniques described herein. In at least one example, the system 500 may include a vehicle, such as vehicle 502. The vehicle 502 may include one or more vehicle computing devices 504, one or more sensor systems 506, one or more emitters 508, one or more communication connections 510, at least one direct connection 512, and one or more drive systems 514.

The vehicle computing device 504 may include one or more processors 516 and memory 518 communicatively coupled with the processor(s) 516. In the illustrated example, the vehicle 502 is an autonomous vehicle; however, the vehicle 502 could be any other type of vehicle, such as a semi-autonomous vehicle, or any other system having at least an image capture device (e.g., a camera-enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In the illustrated example, the memory 518 of the vehicle computing device 504 stores a localization component 520, a perception component 522, a machine-learned model component 524, a prediction component 526, a planning component 528, one or more system controllers 532, and one or more maps 530 (or map data). Though depicted in FIG. 5 as residing in the memory 518 for illustrative purposes, it is contemplated that the localization component 520, the perception component 522, the machine-learned model component 524, the prediction component 526, the planning component 528, system controller(s) 532, and/or the map(s) may additionally, or alternatively, be accessible to the vehicle 502 (e.g., stored on, or otherwise accessible by, memory remote from the vehicle 502, such as, for example, on memory 540 of one or more computing device 536 (e.g., a remote computing device)). In some examples, the memory 540 may include a rotation matrix generating component 542, a feature vector rotating component 544, a feature vector updating component 546, and/or an output feature vector updating component 548.

In at least one example, the localization component 520 may include functionality to receive sensor data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 530, and may continuously determine a location and/or orientation of the vehicle 502 within the environment. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 502. In some instances, the localization component 520 may provide data to various components of the vehicle 502 to determine an initial position of the vehicle 502 for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The machine-learned model component 524 may perform any of the techniques described with respect to any of FIGS. 1-4 above with respect to preforming prediction based on relative position data of an object and/or absolute yaw data of the object. Further, in other examples, the machine-learned model component 524 may be within or otherwise associated with the perception component 522, the prediction component 526, and/or the planning component 528.

The prediction component 526 may generate one or more probability maps representing prediction probabilities of possible locations of one or more objects in an environment. For example, the prediction component 526 may generate one or more probability maps for vehicles, pedestrians, animals, and the like within a threshold distance from the vehicle 502. In some instances, the prediction component 526 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 526 may generate predicted trajectories of objects (e.g., objects) in an environment. For example, the prediction component 526 may generate one or more predicted trajectories for objects within a threshold distance from the vehicle 502. In some examples, the prediction component 526 may measure a trace of an object and generate a trajectory for the object based on observed and predicted behavior.

In general, the planning component 528 may determine a path for the vehicle 502 to follow to traverse through an environment. For example, the planning component 528 may determine various routes and trajectories and various levels of detail. For example, the planning component 528 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 528 may generate an instruction for guiding the vehicle 502 along at least a portion of the route from the first location to the second location. In at least one example, the planning component 528 may determine how to guide the vehicle 502 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 528 may select a trajectory for the vehicle 502.

In other examples, the planning component 528 may alternatively, or additionally, use data from the localization component 520, the perception component 522, the machine-learned model component 524, and/or the prediction component 526 to determine a path for the vehicle 502 to follow to traverse through an environment. For example, the planning component 528 may receive data (e.g., object data) from the localization component 520, the perception component 522, the machine-learned model component 524, and/or the prediction component 526 regarding objects associated with an environment. In some examples, the planning component 528 receives data for relevant objects within the environment. Using this data, the planning component 528 may determine a route to travel from a first location (e.g., a current location) to a second location (e.g., a target location) to avoid objects in an environment. In at least some examples, such a planning component 528 may determine there is no such collision-free path and, in turn, provide a path that brings vehicle 502 to a safe stop avoiding all collisions and/or otherwise mitigating damage.

In at least one example, the vehicle computing device 504 may include one or more system controllers 532, which may be configured to control steering, propulsion, braking, safety, emitters, communication, and other systems of the vehicle 502. The system controller(s) 532 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 530. That is, the map(s) 530 may be used in connection with the localization component 520, the perception component 522, the machine-learned model component 524, the prediction component 526, and/or the planning component 528 to determine a location of the vehicle 502, detect objects in an environment, generate routes, determine actions and/or trajectories to navigate within an environment.

In some examples, the one or more maps 530 may be stored on a remote computing device(s) (such as the computing device(s) 536) accessible via network(s) 534. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

In some instances, aspects of some or all of the components discussed herein may include any models, techniques, and/or machine-learned techniques. For example, in some instances, the components in the memory 518 (and the memory 540, discussed below) may be implemented as a neural network.

As described herein, an exemplary neural network is a technique that passes input data through a series of connected layers to produce an output. Each layer in a neural network may also comprise another neural network, or may comprise any number of layers (whether convolutional or not). As may be understood in the context of this disclosure, a neural network may utilize machine-learning, which may refer to a broad class of such techniques in which an output is generated based on learned parameters.

Although discussed in the context of neural networks, any type of machine-learning may be used consistent with this disclosure. For example, machine-learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pretrained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 534, to the one or more computing device(s) 536 at a particular frequency, after a lapse of a predetermined period of time, in near real-time, etc.

The vehicle 502 may also include one or more emitters 508 for emitting light and/or sound. The emitter(s) 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., computing device 536, other nearby vehicles, etc.) and/or one or more remote sensor system(s) for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 534. For example, the communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the prediction component 526, the planning component 528, the one or more system controllers 532, and the one or more maps 530 may process sensor data, as described above, and may send their respective outputs, over the one or more network(s) 534, to the computing device(s) 536. In at least one example, the localization component 520, the perception component 522, the prediction component 526, the planning component 528, the one or more system controllers 532, and the one or more maps 530 may send their respective outputs to the computing device(s) 536 at a particular frequency, after a lapse of a predetermined period of time, in near real-time, etc.

In some examples, the vehicle 502 may send sensor data to the computing device(s) 536 via the network(s) 534. In some examples, the vehicle 502 may receive sensor data from the computing device(s) 536 and/or remote sensor system(s) via the network(s) 534. The sensor data may include raw sensor data and/or processed sensor data and/or representations of sensor data. In some examples, the sensor data (raw or processed) may be sent and/or received as one or more log files.

The computing device(s) 536 may include processor(s) 538 and a memory 540, which may include a rotation matrix generating component 542, a feature vector rotating component 544, a feature vector updating component 546, and/or an output feature vector updating component 548. In some examples, the memory 540 may store one or more of components that are similar to the component(s) stored in the memory 518 of the vehicle 502. In such examples, the computing device(s) 536 may be configured to perform one or more of the processes described herein with respect to the vehicle 502. In some examples, the rotation matrix generating component 542, the feature vector rotating component 544, the feature vector updating component 546, and/or the output feature vector updating component 548 may perform substantially similar functions as the machine-learned model component 524.

The processor(s) 516 of the vehicle 502 and the processor(s) 538 of the computing device(s) 536 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 540 are examples of non-transitory computer-readable media. The memory 518 and memory 540 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 6:
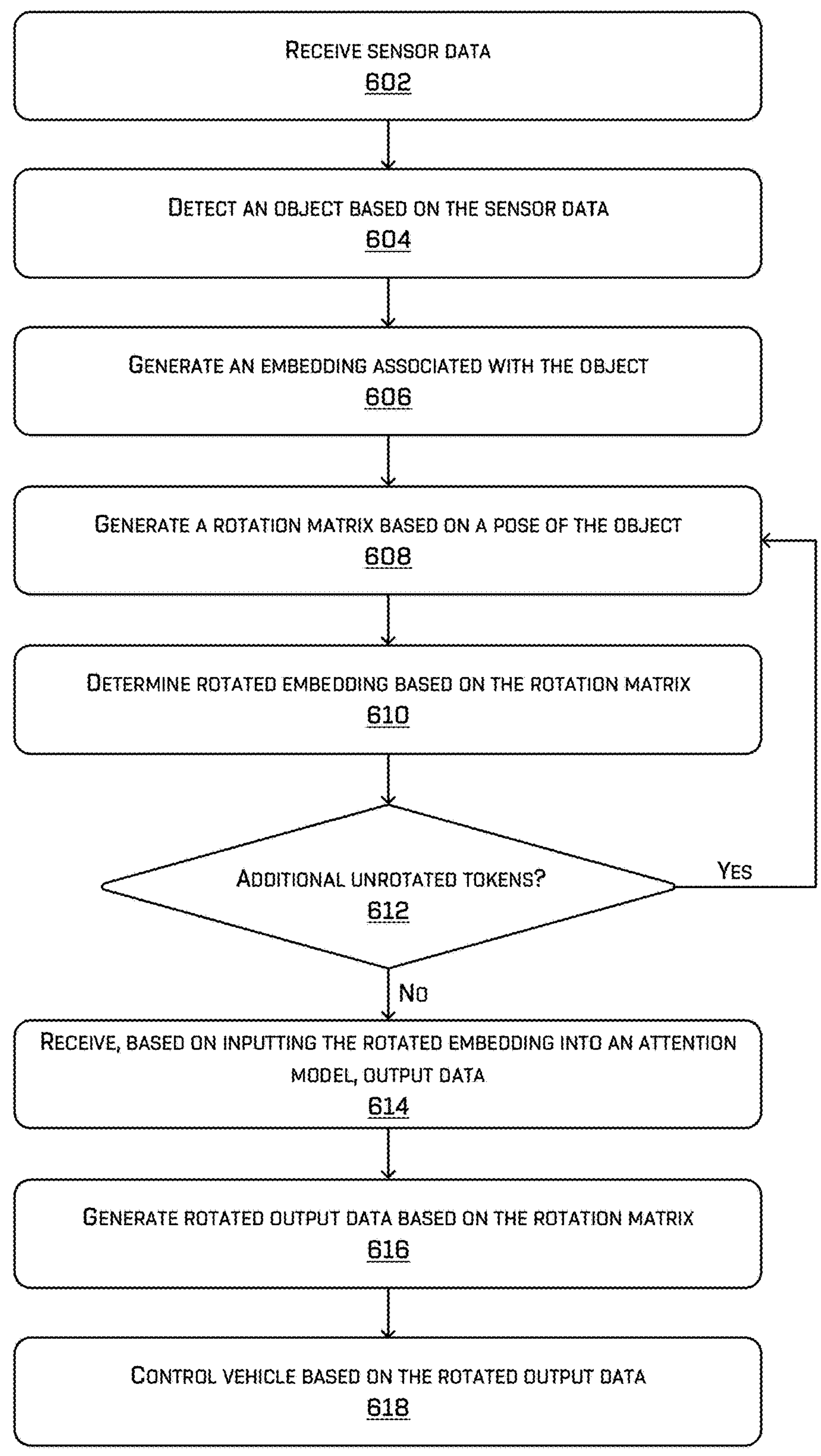
FIG. 6 is a flow diagram illustrating an example process for detecting an object, generating embedding data associated with the object, generating a rotation matrix, generating updated embedding data based on the rotation matrix, receiving output data based on inputting the updated embedding data to an attention model, and controlling the vehicle based on the output data, in accordance with one or more examples of the disclosure.

FIG. 6 is a flow diagram illustrating an example process 600 for detecting an object, generating embedding data associated with the object, generating a rotation matrix, generating updated embedding data based on the rotation matrix, receiving output data based on inputting the updated embedding data to an attention model, and controlling the vehicle based on the output data. As described below, the example process 600 may be performed by one or more computer-based components configured to implement various functionalities described herein. For instance, process 600 may be performed by a machine-learned model component 202. As described above, the machine-learned model component may be integrated as an on-vehicle system in some examples. However, in other examples, the machine-learned model component may be integrated as a separate server-based system.

Process 600 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 602, the vehicle may receive sensor data. That is, the vehicle may capture sensor data while navigating an environment. The vehicle may include one or more sensor device(s) (e.g., lidar device(s), radar device(s), time-of-flight device(s), image capturing device(s), etc.) located or mounted at various positions within or on the vehicle body. In such cases, the sensor device(s) may capture sensor data of the environment proximate the vehicle.

At operation 604, the vehicle may detect an object based on the sensor data. That is, the vehicle may analyze the sensor data and identify one or more object(s) within the environment. For example, the sensor data may include one or more static and/or dynamic objects such as other vehicle (s) (e.g., cars, trucks, motorcycles, cyclists, etc.), pedestrians, animals, stationary object(s) (e.g., dynamic objects that have a velocity of zero), trees, bushes, buildings, signage, road markings, etc. The vehicle may detect the object(s) using one or more machine-learned models. In some examples, the object(s) may include various types of object data (or object features) such as a classification (or type), a pose (e.g., position (e.g., x- and y-coordinate) and/or heading (or yaw)), a size, a velocity, an acceleration, a track (or history), etc.

At operation 606, the vehicle may generate an embedding associated with the object. An embedding may be a structured form of representing data, characteristics, and/or features of the object. The vehicle may generate a single embedding (or token or feature vector) for each object. That is, if the vehicle identifies two objects, the vehicle may generate a first embedding associated with the first of the two objects and a second embedding associated with the second of the two objects. In some examples, the embedding may include one or more channels (e.g., 50, 100, 200, etc.)

that are designed to contain data representing features (or object data) of the object. In this case, the embedding may include various types of data that do not depend on a coordinate frame. That is, the embedding may lack position data.

At operation 608, the vehicle may generate a rotation matrix based on a pose of the object. For example, an attention model or the vehicle may generate rotation matrices based on the pose(s) of the object(s). The rotation matrix may be a product of the x-coordinate, the y-coordinate, and/or the yaw scaled to different amounts. For example, the attention model may identify the x-coordinate and/or the y-coordinate of an object and generate a rotation matrix based on the x and/or y coordinates. The attention model or the vehicle may use a rotation matrix similar to that in Equation 3. In some cases, the attention model may generate multiple different rotation matrices for a single object. That is, the attention model may generate rotation matrices using the x-coordinate, the y-coordinate, the yaw, and/or a timestamp of the received data. Accordingly, each token may have one or more corresponding rotation vectors that correspond to the object pose. For example, the attention model may generate a first rotation matrix using the pose of a first object, a second rotation matrix using the pose of a second object, etc. In this example, the feature vector at the first index corresponds to the first object and as such, the first rotation matrix corresponds to the feature vector at the first index. Further, the feature vector at the second index may correspond to the second object and as such, the second rotation matrix corresponds to the feature vector at the second index.

At operation 610, the vehicle may determine a rotated embedding based on the rotation matrix. That is, after adding the absolute yaw to the feature vector, the attention model may use the rotation matrices to update (or rotate) the feature vectors. As noted above, the feature vector (or embedding) may include multiple different channels that contain data representing feature(s) of the object. Accordingly, when rotating the feature vector, the attention model may discretize the feature vector into one or more groups of feature vectors. Specifically, the attention model can discretize the feature vector into sub-feature vectors of two channels. For example, if the feature vector includes 50 channels, the attention model may discretize the feature vector into 25 sub-feature vectors-two channels per sub-feature vector (e.g., 1×2 matrix).

Based on discretizing the feature vector, the attention model may rotate the sub-feature vectors based on the rotation matrix. That is, the attention model may apply the rotation matrix to the first sub-feature vector which may result in a rotated sub-feature vector. The attention model may perform such operations to some or all the remaining sub-feature vectors.

Based on rotating the sub-feature vectors, the attention model may concatenate the rotated sub-feature vectors into a single rotated feature vector. That is, the attention model may cause the rotated sub-feature vectors to combine into a single feature vector. Continuing the example from above, the attention model may combine the 25 rotated sub-feature vectors into a single rotated feature vector.

At operation 612, the vehicle may determine whether there are unrotated tokens. In some examples, the attention model may perform such operations to some or all feature vectors in the list of feature vectors (or to the list of embeddings). As such, if there are unrotated token(s) (612: Yes), the attention model or the vehicle may proceed with rotating the remainder of the unrotated token(s). As shown, the vehicle may return to operation 608 and follow a similar flow as is shown in FIG. 6.

In contrast, if there are no remaining unrotated token(s) (612: No), the attention model or vehicle may input the rotated tokens into the attention model. That is, at operation 614, the vehicle may receive, based on inputting the rotated embedding into an attention model, output data. In some examples, the attention model may perform self and/or cross attention on the rotated feature vectors. The attention model may be a traditional attention model, a flash attention model, etc. The attention model may update or modify the rotated feature vectors and provide output data. That is, the attention model may receive, as input, the rotated feature vectors and provide, as output, output data (or an output feature vector).

At operation 616, the vehicle may generate rotated output data based on the rotation matrix. The purpose of rotating the output feature vector is because such a rotation may provide depth information to the vehicle and/or other machine-learned models. As such, the machine-learned model may perform similar rotation operations on the output feature vector as were performed on the initial embeddings. For example, the machine-learned model may discretize the output feature vector into sub-feature vectors, rotate the sub-feature vectors by applying the rotation matrices to the sub-feature vectors, and/or concatenating the rotated sub-feature vectors into a single output feature vector.

At operation 618, the vehicle may control the vehicle based on the rotted output data. In some examples, the vehicle may use the rotated output feature vector to control the vehicle. After receiving the output token(s) (e.g., rotated output feature vectors), the machine-learned model may send the output token(s) to one or more subsequent layers within the network. Further, after passing through the whole network, the data may be sent and/or used to predict object data, classify a driving scene, generate vehicle actions, etc.

Figure 7:
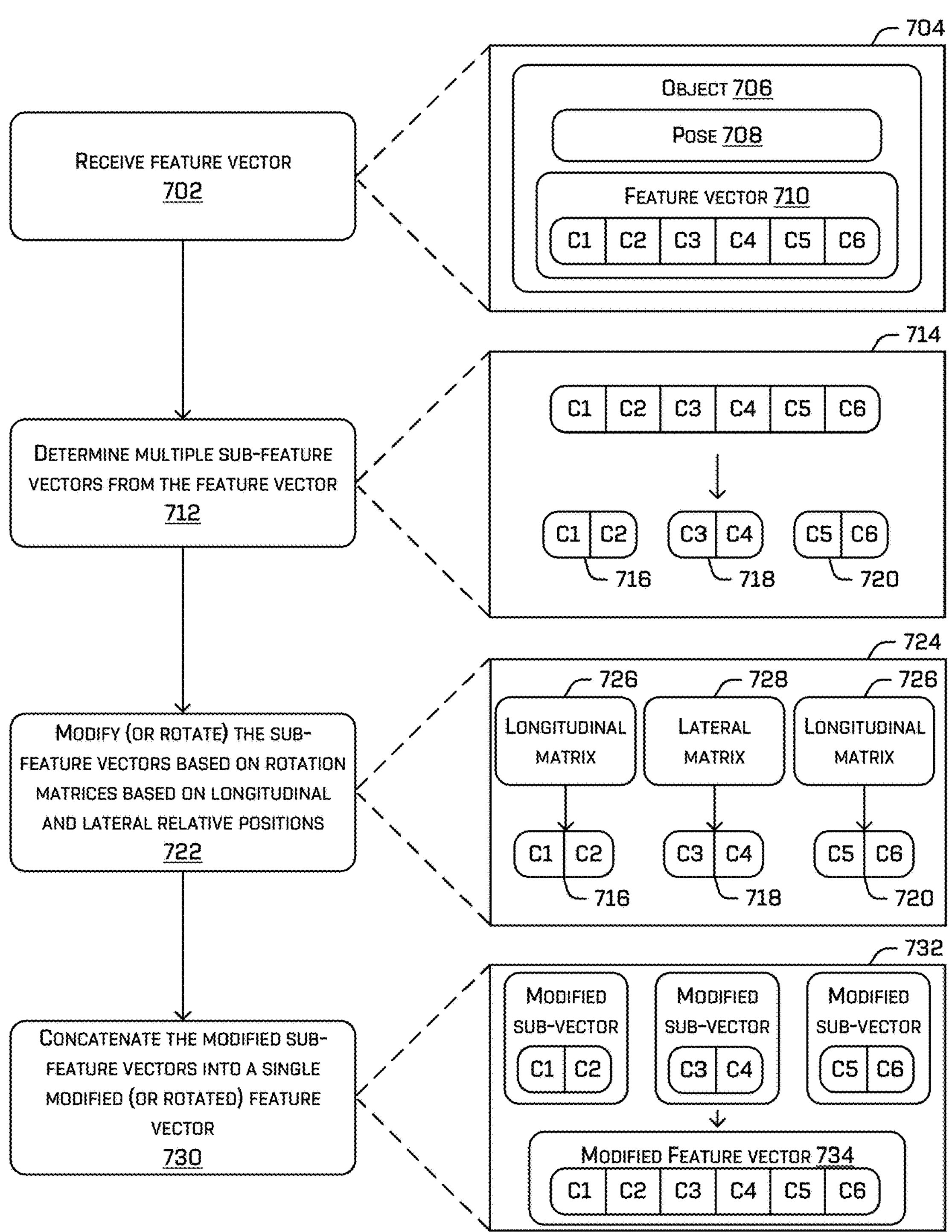
FIG. 7 is a pictorial flow diagram illustrating an example process for discretizing a feature vector into multiple sub-feature vectors, rotating the multiple sub-feature vectors based on rotation matrices determined from relative lateral and/or longitudinal positions, and/or generating a single rotated feature vector based on the multiple rotated sub-feature vectors, in accordance with one or more examples of the disclosure.

FIG. 7 is a pictorial flow diagram illustrating an example process 700 for discretizing a feature vector into multiple sub-feature vectors, rotating the multiple sub-feature vectors based on rotation matrices determined from relative lateral and/or longitudinal positions, and/or generating a single rotated feature vector based on the multiple rotated sub-feature vectors. As shown in this example, some or all of the operations in the example process 700 may be performed by a machine-learned model component, a perception component, a prediction component, a planning component, and/or any other component or system within an autonomous vehicle.

At operation 702, the vehicle may receive a feature vector. In some examples, a vehicle may capture sensor data while navigating through an environment. The vehicle may use the sensor data to detect objects proximate the vehicle. Further, the vehicle may use the sensor data to determine or otherwise identify one or more characteristics and/or features associated with the object such as a pose, a velocity, a classification, a state, etc. In some cases, the vehicle may generate an embedding (or feature vector) associated with the vehicle. For example, the box 704 illustrates object data that includes a pose and/or a feature vector. In this example, box 704 includes a detection of an object 706. The object 706 may be any dynamic, static, or stationary object. As shown, the box 704 may include a pose 708 of the object 706. The pose 708 may include an x-coordinate, a y-coordinate, and/or a heading (or yaw). The pose 708 may be based on a global or local frame of reference. Further, the box 704 may include a feature vector 710 that is associated with the object 706. As shown, the feature vector 710 may include multiple channels. Specifically, the feature vector 710 may include six channels. However, this is not intended to be limiting; in other examples, the feature vector 710 may have more or fewer channels. As noted above, each channel may contain data associated with or corresponding to a feature or characteristic of the object 706.

At operation 712, the vehicle may discretize the feature vector into a plurality of sub-feature vectors. That is, the vehicle may input the feature vector 710 into a machine-learned model. The machine-learned model may include an attention layer (or model) which may perform self- and/or cross-attention. In such case, prior to inputting the feature vector 710 into the attention model, the vehicle may rotate the feature vector 710. To rotate the feature vector 710, the vehicle may generate a rotation matrix and apply the rotation matrix to the feature vector 710. However, in some cases, the vehicle may discretize (or chunk) the feature vector 710 prior to applying the rotation matrix to the feature vector 710. For example, box 714 illustrates the channels of the feature vector 710 grouped into multiple sub-feature vectors. In this example, the vehicle may group the feature vector 710 into sub-vectors with two channels. For example, box 714 illustrates a sub-feature vector 716 that includes channel one and channel two from the feature vector 710, sub-feature vector 718 that includes channel three and channel four from the feature vector 710, and sub-feature vector 720 that includes channel five and channel six from the feature vector 710. However, in other examples, the vehicle may group the channels in non-sequential order (e.g., channel 1 is grouped with channel 5).

At operation 722, the vehicle may modify (or rotate) the sub-feature vectors based on a rotation matrix. As described above, the vehicle may generate a rotation matrix based on the pose 708 of the object 706. That is, the vehicle may determine the rotation matrices by using the equations above. In such cases, the rotation matrices may be based on the relative lateral and/or longitudinal positions between objects. Based on generating the relative lateral rotation matrix and/or the relative longitudinal rotation matrix and the one or more sub-feature vectors, the vehicle may rotate the sub-feature vectors based on applying the rotation matrices to the sub-feature vectors. For example, box 724 illustrates modifying the sub-feature vectors. In this example, the box 724 includes the longitudinal matrix 726 (e.g., $\varphi(r_x)$) that is associated with the object 706. In this case, the vehicle may apply the longitudinal matrix 726 to some or all sub-feature vectors. For example, box 724 illustrates applying the longitudinal matrix 726 to the sub-feature vector 716 which may result in a rotated (or modified) sub-feature vector, the lateral matrix 728 (e.g., $\varphi(r_y)$) to the sub-feature vector 718 which may result in a rotated (or modified) sub-feature vector, and the longitudinal matrix 726 to the sub-feature vector 720 which may result in a rotated (or modified) sub-feature vector. Of course, in some examples, the longitudinal matrix 726 being applied to the sub-feature vector 716 may be the same or different rotation matrix as the longitudinal matrix 726 being applied to the sub-feature vector 720.

At operation 730, the vehicle may concatenate the modified sub-feature vectors into a single modified (or rotated) feature vector. That is, the vehicle may combine the multiple rotated sub-feature vectors into a single rotated feature vector. For example, box 732 illustrates concatenating the rotated sub-feature vectors. In this example, the box 732 illustrates a rotated sub-feature vector that includes the first and second channels, a rotated sub-feature vector that includes the third and fourth channels, and a rotated sub-feature vector that includes the fifth and sixth channels. Importantly, in some cases, the modified sub-feature vector(s) may include more or fewer channels (or dimensions) than the initial sub-feature vector due to the varying dimension(s) of the longitudinal and/or lateral matrices. Of note, the rotated sub-feature vectors may be distinct and/or separate feature vectors. Accordingly, the box 732 illustrates combining the rotated sub-feature vectors into a single modified feature vector 734. The modified feature vector 734 may be a rotated version of the feature vector 710 of the object 706. As discussed above and throughout, the vehicle may input the modified feature vector 734 into an attention model. The attention model may provide, as output, an output feature vector. In such cases, the vehicle may perform similar or identical operations as described in FIG. 7 to rotate the output feature vector. The rotated output feature vector may be used to generate prediction data, evaluate a driving scene, etc.

Figure 8:
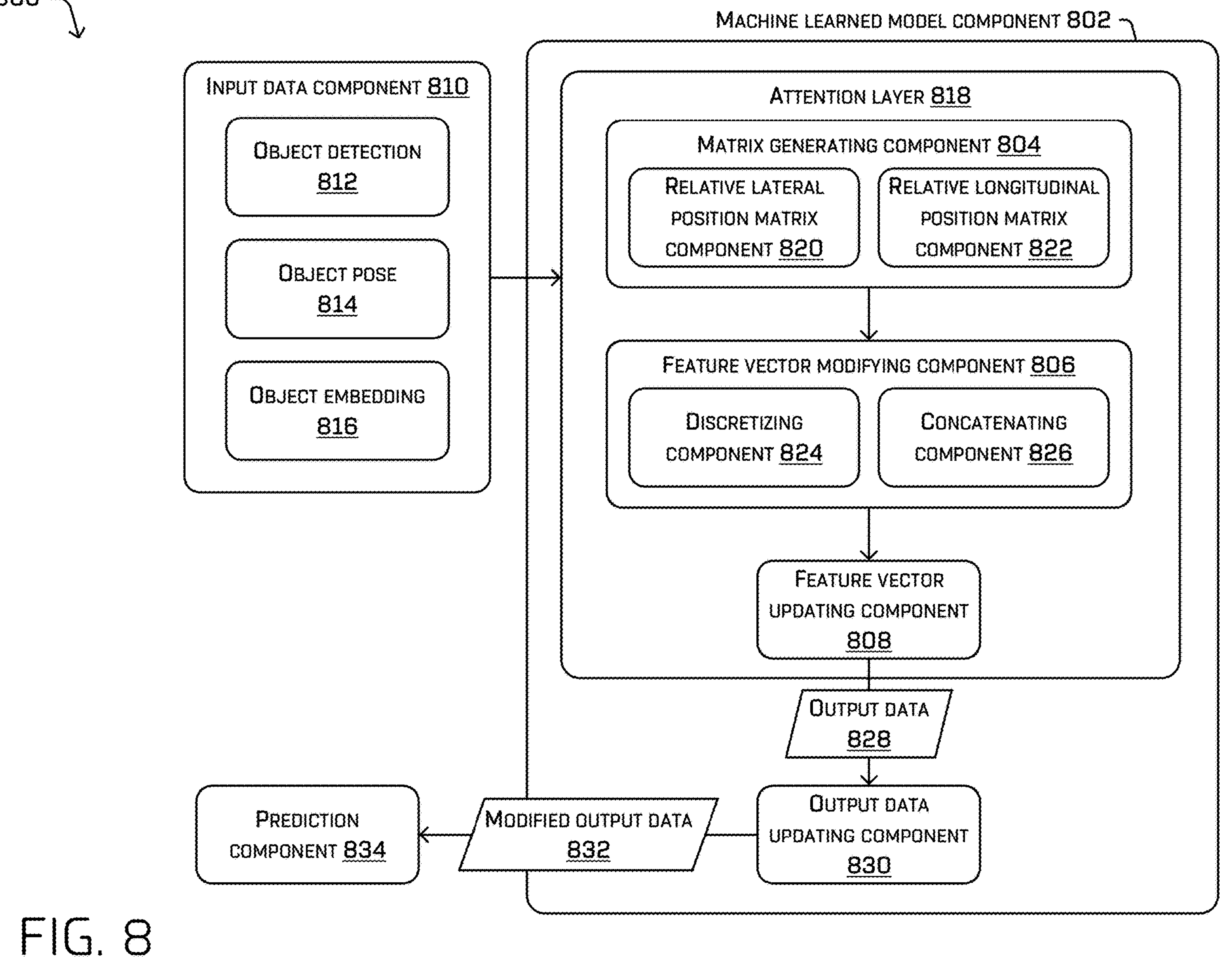
FIG. 8 illustrates an example computing system including a machine-learned model component configured to generate rotated attention model output based on lateral and/or longitudinal relative position data, in accordance with one or more examples of the disclosure.

FIG. 8 illustrates an example computing system 800 including a machine-learned model component 802 configured to generate rotated attention model output based on lateral and/or longitudinal relative position data.

In some examples, the machine-learned model component 802 may be similar or identical to the machine-learned model component described above, or in any other examples herein. As noted above, in some cases the machine-learned model component 802 may be implemented within an autonomous vehicle. In some examples, the machine-learned model component 802 may include various components, described below, configured to perform different functionalities of a technique to perform prediction using relative lateral and/or longitudinal position data. In some examples, the machine-learned model component 802 may include a matrix generating component 804 configured to generate rotation matrices, a feature vector modifying component 806 configured to modify feature vector(s) associated with object(s), and/or a feature vector updating component 808 configured to update the modified feature vector based on an attention model.

In some examples, the machine-learned model component 802 may receive input data from an input data component 810. As shown, the input data component 810 may include one or more sub-components which may include an object detection component 812, an object pose component 814, and/or an object embedding component 816. The object detection component 812 may include data associated with a detected object. For example, the object data may include velocity data, acceleration data, track data, classification data, state data, etc. The object pose component 814 may include an absolute pose (e.g., position and/or heading (or yaw)) of the object in the object detection component 812. The absolute pose may align with a global or local frame of reference. The object embedding component 816 may include an embedding (e.g., feature vector or token) associated with a specific object in the object detection component 812. As noted above, the embedding may include one or more channels which may include data representative of features or characteristics of the object. As shown, the machine-learned model component 802 may receive the input data from the input data component 810.

As shown, the machine-learned model component 802 may include an attention layer 818. In some examples, the machine-learned model component 802 may include one or more blocks or layers (e.g., series of layers). In this example, the machine-learned model component 802 may include at least one attention layer 818 (or flash attention layers). However, in other examples, the machine-learned model component 802 may include more than one attention layer. Further, FIG. 8 illustrates that the attention layer 818 includes multiple sub-components; however, in other examples, the sub-components may be located external to the attention layer 818. As shown, the attention layer 818 may include the matrix generating component 804, the feature vector modifying component 806, and/or the feature vector updating component 808.

In some examples, the machine-learned model component 802 may include a matrix generating component 804 configured to generate rotation matrices. The matrix generating component 804 may generate a rotation matrix based on a lateral relative position and a rotation matrix based on a longitudinal relative position. For example, the matrix generating component 804 may include a relative lateral position matrix component 820 and a relative longitudinal position matrix component 822. The relative lateral position matrix component 820 may be configured to generate a rotation matrix (e.g., $\varphi(r_y)$) using the equations above. That is, the relative lateral position matrix component 820 may perform the operations associated with Equations 4-10 above with respect to the lateral position rather than the longitudinal position. As noted above, the rotation matrix may be a result of one or more matrices (e.g., $Ø^k$ and $Ø^q$) based on the pose of a first and second object. Further, the relative longitudinal position matrix component 822 may generate a rotation matrix (e.g., $\varphi(r_x)$) by performing the operations associated with Equations 4-10 above. As shown, the matrix generating component 804 may send the rotation matrices to the feature vector updating component 808. As noted above, the rotation matrix may be a result of one or more matrices (e.g., $Ø^k$ and $Ø^q$) based on the pose of a first and second object.

In some examples, the machine-learned model component 802 may include a feature vector modifying component 806 configured to rotate feature vector(s) associated with object (s). The feature vector modifying component 806 may receive the rotation matrices and/or any other input data from the input data component 810. The feature vector modifying component 806 may modify the object embedding (or feature vector) based on applying the rotation matrix that corresponds to the same object as the feature vector with the feature vector. When rotating the feature vector, a discretizing component 824 may discretize the feature vector into one or more sub-feature vectors. That is, the discretizing component 824 may generate sub-feature vectors that include two (or more) channels of the original feature vector. Based on generating the sub-feature vectors, the feature vector modifying component 806 may apply the rotation matrix to each of the sub-feature vectors which may result in rotated (or modified) sub-feature vectors.

Based on rotating the sub-feature vectors, the concatenating component 826 of the feature vector modifying component 806 may concatenate the rotated sub-feature vectors into a single rotated feature vector. That is, the concatenating component 826 may combine some or all of the rotated sub-feature vectors into a single rotated feature vector. Additional description regarding rotating the feature vector may be discussed in FIGS. 3 and 4.

In some examples, the machine-learned model component 802 may include a feature vector updating component 808 configured to update the rotated (or modified) feature vector based on an attention model. In such cases, the feature vector updating component 808 may receive the rotated (or modified) feature vector from the feature vector modifying component 806. The feature vector updating component 808 may input the rotated (or modified) feature vector into the attention layer 218 (or model) such that the attention layer 818 may perform self- and/or cross-attention on the rotated feature vector. Based on performing attention on the rotated feature vector, the attention layer 818 may provide, as output, an output feature vector 828. The feature vector updating component 808 may send the output feature vector 828 to an output data updating component 830.

In some examples, the output data updating component 830 may rotate (or modify) the output feature vector 828. That is, the output data updating component 830 may perform similar or identical operations as discussed in the feature vector modifying component 806 on the output feature vector 828. The output data updating component 830 may apply the rotation matrix (e.g., $\varphi(r_y)$ or $\varphi(r_x)$) determined by the matrix generating component 804 to the output feature vector 828. The output data updating component 830 may send the modified output feature vector 832 to one or more prediction components 834. The prediction component 834 may use the modified output feature vector 832 to generate prediction data.

FIG. 9 is a flow diagram illustrating an example process 900 for detecting an object, generating embedding data associated with the object, generating a rotation matrix based on relative lateral and/or longitudinal position data, generating updated embedding data based on the rotation matrix, receiving output data based on inputting the updated embedding data to an attention model, and controlling the vehicle based on the output data. As described below, the example process 900 may be performed by one or more computer-based components configured to implement various functionalities described herein. For instance, process 900 may be performed by a machine-learned model component 202 and the machine-learned model component 802. As described above, the machine-learned model component may be integrated as an on-vehicle system in some examples. However, in other examples, the machine-learned model component may be integrated as a separate server-based system.

Process 900 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 902, the vehicle may receive sensor data. That is, the vehicle may capture sensor data while navigating an environment. The vehicle may include one or more sensor device(s) (e.g., lidar device(s), radar device(s), time-of-flight device(s), image capturing device(s), etc.) located or mounted at various positions within or on the vehicle body. In such cases, the sensor device(s) may capture sensor data of the environment proximate the vehicle.

At operation 904, the vehicle may detect an object based on the sensor data. That is, the vehicle may analyze the sensor data and identify one or more object(s) within the environment. For example, the sensor data may include one or more static and/or dynamic objects such as other vehicle (s) (e.g., cars, trucks, motorcycles, cyclists, etc.), pedestrians, animals, stationary object(s) (e.g., dynamic objects that have a velocity of zero), trees, bushes, buildings, signage, road markings, etc. The vehicle may detect the object(s) using one or more machine-learned models. In some examples, the object(s) may include various types of object data (or object features) such as a classification (or type), a pose (e.g., position (e.g., x- and y-coordinate) and/or heading (or yaw)), a size, a velocity, an acceleration, a track (or history), etc.

At operation 906, the vehicle may generate an embedding associated with the object. An embedding may be a structured form of representing data, characteristics, and/or features of the object. The vehicle may generate a single embedding (or token or feature vector) for each object. That is, if the vehicle identifies two objects, the vehicle may generate a first embedding associated with the first of the two objects and a second embedding associated with the second of the two objects. In some examples, the embedding may include one or more channels (e.g., 50, 100, 200, etc.) that are designed to contain data representing features (or object data) of the object. In this case, the embedding may include various types of data that do not depend on a coordinate frame. That is, the embedding may lack position data.

At operation 908, the vehicle may generate a first matrix based on a pose of the object (or a first object). For example, an attention model or the vehicle may generate a rotation matrix based on the pose of the object. The attention model or the vehicle may determine the rotation matrix by performing the operations in Equations 4-7. In some examples, the first matrix may correspond to the matrix $\O^q$, as described above. The matrix $\O^q$ may be defined in Equation 7 above.

At operation 910, the vehicle may generate a second matrix based on a position of the vehicle. As noted above, the matrix $\varphi(r_x)$ may include multiple matrices such as $\O^q$ (e.g., generated at operation 906) and $\O^k$. In this case, the second matrix may correspond to $\O^k$. The vehicle may determine $\O^k$ by performing the operations in Equations 4-6 and 8-10.

At operation 912, the vehicle may determine a rotated embedding based on the first matrix and the second matrix. As noted above, the feature vector (or embedding) may include multiple different channels that contain data representing feature(s) of the object. Accordingly, when rotating the feature vector, the attention model may discretize the feature vector into one or more groups of feature vectors. Specifically, the attention model can discretize the feature vector into sub-feature vectors of two channels. For example, if the feature vector includes 50 channels, the attention model may discretize the feature vector into 25 sub-feature vectors-two channels per sub-feature vector (e.g., 1×2 matrix).

Based on discretizing the feature vector, the attention model may rotate the sub-feature vectors based on the first matrix and the second matrix. That is, the attention model may apply the first matrix and the second matrix to the first sub-feature vector which may result in a rotated sub-feature vector. Alternatively or additionally, the attention model may rotate the queries sub-feature vector by the first matrix and the keys sub-feature vector by the second matrix. The attention model may perform such operations to some or all the remaining sub-feature vectors.

Based on rotating the sub-feature vectors, the attention model may concatenate the rotated sub-feature vectors into a single rotated feature vector. That is, the attention model may cause the rotated sub-feature vectors to combine into a single feature vector. Continuing the example from above, the attention model may combine the 25 rotated sub-feature vectors into a single rotated feature vector.

At operation 914, the vehicle may determine whether there are unrotated tokens. In some examples, the attention model may perform such operations to some or all feature vectors in the list of feature vectors (or to the list of embeddings). As such, if there are unrotated token(s) (914: Yes), the attention model or the vehicle may proceed with rotating the remainder of the unrotated token(s). As shown, the vehicle may return to operation 908 and follow a similar flow as is shown in FIG. 9.

In contrast, if there are no remaining unrotated token(s) (914: No), the attention model or vehicle may input the rotated tokens into the attention model. That is, at operation 916, the vehicle may receive, based on inputting the rotated embedding into an attention model, output data. In some examples, the attention model may perform self- and/or cross-attention on the rotated feature vectors. The attention model may be a traditional attention model, a flash attention model, etc. The attention model may update or modify the rotated feature vectors and provide output data. That is, the attention model may receive, as input, the rotated feature vectors and provide, as output, output data (or an output feature vector).

At operation 918, the vehicle may generate rotated output data based on the first matrix and the second matrix. The purpose of rotating the output feature vector is because such a rotation may provide depth information to the vehicle and/or other machine-learned models. As such, the machine-learned model may perform similar rotation operations on the output feature vector as were performed on the initial embeddings. For example, the machine-learned model may discretize the output feature vector into sub-feature vectors, rotate the sub-feature vectors by applying the first and second matrices to the sub-feature vectors, and/or concatenate the rotated sub-feature vectors into a single output feature vector.

At operation 920, the vehicle may control the vehicle based on the rotated output data. In some examples, the vehicle may use the rotated output feature vector to control the vehicle. After receiving the output token(s) (e.g., rotated output feature vectors), the machine-learned model may send the output token(s) to one or more subsequent layers within the network. Further, after passing through the whole network, the data may be sent and/or used to predict object data, classify a driving scene, generate vehicle actions, etc.

Example Clauses

A: A system comprising: one or more processors; and one or more non-transitory computer-readable media storing computer-executable instructions that, when executed, cause the system to perform operations comprising: receiving, from a sensor device of a vehicle, sensor data on an environment; detecting, based at least in part on the sensor data, an object, the object including a pose; generating, based at least in part on the sensor data, an embedding associated with the object; determining, based at least in part on inputting the embedding and the pose into a machine learned model, rotated output data, wherein determining the rotated output data comprises: generating, based at least in part on the pose, a rotation matrix; determining, based at least in part on the rotation matrix, a rotated embedding associated with the embedding; receiving, in response to inputting the rotated embedding into an attention layer of the machine learned model, output data; and generating, based at least in part on the rotation matrix and the output data, the rotated output data; and controlling the vehicle based at least in part on the rotated output data.

B: The system of paragraph A, wherein the embedding is a feature vector, wherein determining the rotated embedding comprises: determining, based at least in part on the feature vector, a first sub-feature vector and a second sub-feature vector; and determining, based at least in part on the rotation matrix, a first modified sub-feature vector and a second modified sub-feature vector.

C: The system of paragraph B, wherein determining the rotated embedding further comprises: determining, based at least in part on combining the first modified sub-feature vector and the second modified sub-feature vector, the rotated embedding.

D: The system of paragraph A, wherein determining the rotated embedding comprises: determining, based at least in part on the sensor data, an absolute yaw of the object, wherein determining the rotated embedding is based at least in part on the absolute yaw of the object.

E: The system of paragraph A, wherein determining the rotated output data is based at least in part on: determining, based at least in part on the output data, multiple sub-feature vectors, and wherein determining the rotated output data is based at least in part on rotating the multiple sub-feature vectors.

F: One or more non-transitory computer-readable media storing instructions executable by one or more processors, wherein the instructions, when executed, cause a system to perform operations comprising: identifying an object and a pose of the object; generating an embedding associated with the object; generating, based at least in part on the pose, a rotation matrix; determining, based at least in part on the rotation matrix, a rotated embedding associated with the embedding; inputting the rotated embedding into an attention layer; and controlling a vehicle based at least in part on output data of the attention layer.

G: The one or more non-transitory computer-readable media of paragraph F, wherein the embedding is a feature vector, wherein determining the rotated embedding comprises: determining, based at least in part on the feature vector, a first sub-feature vector and a second sub-feature vector; and determining, based at least in part on the rotation matrix, a first modified sub-feature vector and a second modified sub-feature vector.

H: The one or more non-transitory computer-readable media of paragraph G, wherein determining the rotated embedding further comprises: determining, based at least in part on combining the first modified sub-feature vector and the second modified sub-feature vector, the rotated embedding.

I: The one or more non-transitory computer-readable media of paragraph F, wherein determining the rotated embedding comprises: determining, based at least in part on sensor data, an absolute yaw of the object, wherein determining the rotated embedding is based at least in part on the absolute yaw of the object.

J: The one or more non-transitory computer-readable media of paragraph F, wherein the rotation matrix is a first rotation matrix, the operations further comprising: generating, based at least in part on a yaw of the object, a second rotation matrix; determining, based at least in part on the second rotation matrix, a second rotated embedding; generating, based at least in part on inputting the second rotated embedding into the attention layer, second output data; and controlling the vehicle based at least in part on the second output data.

K: The one or more non-transitory computer-readable media of paragraph F, wherein controlling the vehicle comprises: generating, based at least in part on the rotation matrix and the output data, rotated output data.

L: The one or more non-transitory computer-readable media of paragraph K, wherein determining the rotated output data comprises: determining, based at least in part on the output data, multiple sub-feature vectors, and wherein determining the rotated output data is based at least in part on rotating the multiple sub-feature vectors.

M: The one or more non-transitory computer-readable media of paragraph F, wherein generating the rotation matrix is based at least in part on inputting the embedding and the pose into a machine learned model, wherein the attention layer is a flash attention layer within the machine learned model.

N: The one or more non-transitory computer-readable media of paragraph F, wherein identifying the object is based at least in part on at least one of: map data, or sensor data captured by the vehicle.

O: A method comprising: identifying an object and a pose of the object; generating an embedding associated with the object; generating, based at least in part on the pose, a rotation matrix; determining, based at least in part on the rotation matrix, a rotated embedding associated with the embedding; inputting the rotated embedding into an attention layer; and controlling a vehicle based at least in part on output data of the attention layer.

P: The method of paragraph O, wherein the embedding is a feature vector, wherein determining the rotated embedding comprises: determining, based at least in part on the feature vector, a first sub-feature vector and a second sub-feature vector; and determining, based at least in part on the rotation matrix, a first modified sub-feature vector and a second modified sub-feature vector.

Q: The method of paragraph P, wherein determining the rotated embedding further comprises: determining, based at least in part on combining the first modified sub-feature vector and the second modified sub-feature vector, the rotated embedding.

R: The method of paragraph O, wherein determining the rotated embedding comprises: determining, based at least in part on sensor data, an absolute yaw of the object, wherein determining the rotated embedding is based at least in part on the absolute yaw of the object.

S: The method of paragraph O, wherein the rotation matrix is a first rotation matrix, the method further comprising: generating, based at least in part on a yaw of the object, a second rotation matrix; determining, based at least in part on the second rotation matrix, a second rotated embedding; generating, based at least in part on inputting the second rotated embedding into the attention layer, second output data; and controlling the vehicle based at least in part on the second output data.

T: The method of paragraph O, wherein generating the rotation matrix is based at least in part on inputting the embedding and the pose into a machine learned model, wherein the attention layer is a flash attention layer within the machine learned model.

U: A system comprising: one or more processors; and one or more non-transitory computer-readable media storing computer-executable instructions that, when executed, cause the system to perform operations comprising: receiving, from a sensor device of a vehicle, sensor data of an environment; generating, based at least in part on the sensor data, a first embedding associated with a first object; generating, based at least in part on the sensor data, a second embedding associated with a second object; generating, based at least in part on a position of the first object, a first matrix; generating, based at least in part on a heading of the first object, a second matrix; generating, based at least in part on a position of the second object, a third matrix; determining, based at least in part on the first matrix, the second matrix, and the third matrix, a first modified embedding associated with the first embedding and a second modified embedding associated with the second embedding; inputting the first modified embedding and the second modified embedding into an attention layer of a machine-learned model; and controlling the vehicle based at least in part on an output of the machine-learned model.

V: The system of paragraph U, wherein determining the first modified embedding and the second modified embedding comprises: determining, as the first modified embedding and based at least in part on the first matrix and the second matrix, modified queries; and determining, as the second modified embedding and based at least in part on the third matrix, modified keys.

W: The system of paragraph U, wherein the first matrix, the second matrix, and the third matrix are associated with a relative longitudinal angle or a relative lateral angle.

X: The system of paragraph U, wherein the first embedding is a first feature vector, wherein determining the first modified embedding comprises: determining, based at least in part on the first feature vector, a first sub-feature vector and a second sub-feature vector; and determining, based at least in part on the first matrix, the second matrix, and the third matrix, a first modified sub-feature vector and a second modified sub-feature vector.

Y: The system of paragraph U, wherein controlling the vehicle comprises: generating modified output data, based at least in part on the first matrix, the second matrix, the third matrix, and the output; and controlling the vehicle based at least in part on the modified output data.

Z: One or more non-transitory computer-readable media storing instructions executable by one or more processors, wherein the instructions, when executed, cause a system to perform operations comprising: detecting a first object and a second object; generating a first embedding associated with the first object and a second embedding associated with the second object; generating, based at least in part on a pose of the first object, a first matrix; generating, based at least in part on a position of the second object, a second matrix; determining, based at least in part on the first matrix and the second matrix, a first modified embedding associated with at least one of the first embedding or the second embedding; inputting the first modified embedding into an attention layer; and controlling a vehicle based at least in part on output data of the attention layer.

AA: The one or more non-transitory computer-readable media of paragraph Z, wherein determining the first modified embedding comprises: determining, as the first modified embedding and based at least in part on the first matrix, modified queries; and determining, as a second modified embedding and based at least in part on the second matrix, modified keys.

AB: The one or more non-transitory computer-readable media of paragraph Z, wherein the first matrix and the second matrix are associated with a relative longitudinal angle or a relative lateral angle.

AC: The one or more non-transitory computer-readable media of paragraph Z, wherein the first embedding is a feature vector, wherein determining the first modified embedding comprises: determining, based at least in part on the feature vector, a first sub-feature vector and a second sub-feature vector; determining, based at least in part on the first matrix and the second matrix, a first modified sub-feature vector; and determining, based at least in part on a plurality of matrices, a second modified sub-feature vector.

AD: The one or more non-transitory computer-readable media of paragraph Z, wherein the first modified sub-feature vector is modified based at least in part on a longitudinal relative angle and the second modified sub-feature vector is modified based at least in part on a lateral relative angle.

AE: The one or more non-transitory computer-readable media of paragraph Z, wherein determining the first modified embedding further comprises: determining, based at least in part on combining the first modified sub-feature vector and the second modified sub-feature vector, the first modified embedding.

AF: The one or more non-transitory computer-readable media of paragraph AE, wherein controlling the vehicle comprises: generating modified output data, based at least in part on the first matrix, the second matrix, and the output data; and controlling the vehicle based at least in part on the modified output data.

AG: The one or more non-transitory computer-readable media of paragraph Z, wherein generating the modified output data comprises: determining, based at least in part on the output data, multiple sub-feature vectors; and modifying the multiple sub-feature vectors.

AH: The one or more non-transitory computer-readable media of paragraph Z, wherein the first object or the second object is the vehicle.

AI: A method comprising: detecting a first object and a second object; generating a first embedding associated with the first object and a second embedding associated with the second object; generating, based at least in part on a pose of the first object, a first matrix; generating, based at least in part on a position of the second object, a second matrix; determining, based at least in part on the first matrix and the second matrix, a first modified embedding associated with at least one of the first embedding or the second embedding; inputting the first modified embedding into an attention layer; and controlling a vehicle based at least in part on output data of the attention layer.

AJ: The method of paragraph AI, wherein determining the first modified embedding comprises: determining, as the first modified embedding and based at least in part on the first matrix, modified queries; and determining, as a second modified embedding and based at least in part on the second matrix, modified keys.

AK: The method of paragraph AI, wherein the first embedding is a feature vector, wherein determining the first modified embedding comprises: determining, based at least in part on the feature vector, a first sub-feature vector and a second sub-feature vector; determining, based at least in part on the first matrix and the second matrix, a first modified sub-feature vector; and determining, based at least in part on a plurality of matrices, a second modified sub-feature vector.

AL: The method of paragraph AI, wherein the first modified sub-feature vector is modified based at least in part on a longitudinal relative angle and the second modified sub-feature vector is modified based at least in part on a lateral relative angle.

AM: The method of paragraph AI, wherein determining the first modified embedding further comprises: determining, based at least in part on combining the first modified sub-feature vector and the second modified sub-feature vector, the first modified embedding.

AN: The method of paragraph AI, wherein controlling the vehicle comprises: generating modified output data, based at least in part on the first matrix, the second matrix, and the output data; and controlling the vehicle based at least in part on the modified output data.

While the example clauses described above are described with respect to particular implementations, it should be understood that, in the context of this document, the content of the example clauses can be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the system to perform operations comprising:

receiving, from a sensor device of a vehicle, sensor data of an environment;

generating, based at least in part on the sensor data, a first embedding associated with a first object;

generating, based at least in part on the sensor data, a second embedding associated with a second object;

generating, based at least in part on a position of the first object, a first matrix;

generating, based at least in part on a heading of the first object, a second matrix;

generating, based at least in part on a position of the second object, a third matrix;

determining, based at least in part on the first matrix, the second matrix, and the third matrix, a first modified embedding associated with the first embedding and a second modified embedding associated with the second embedding;

inputting the first modified embedding and the second modified embedding into an attention layer of a machine-learned model; and controlling the vehicle based at least in part on an output of the machine-learned model.

2. The system of claim 1, wherein determining the first modified embedding and the second modified embedding comprises:

determining, as the first modified embedding and based at least in part on the first matrix and the second matrix, modified queries; and determining, as the second modified embedding and based at least in part on the third matrix, modified keys.

3. The system of claim 1, wherein the first matrix, the second matrix, and the third matrix are associated with a relative longitudinal angle or a relative lateral angle.

4. The system of claim 1, wherein the first embedding is a first feature vector, wherein determining the first modified embedding comprises:

determining, based at least in part on the first feature vector, a first sub-feature vector and a second sub-feature vector; and determining, based at least in part on the first matrix, the second matrix, and the third matrix, a first modified sub-feature vector and a second modified sub-feature vector.

5. The system of claim 1, wherein controlling the vehicle comprises:

generating modified output data, based at least in part on the first matrix, the second matrix, the third matrix, and the output; and controlling the vehicle based at least in part on the modified output data.

6. One or more non-transitory computer-readable media storing instructions executable by one or more processors, wherein the instructions, when executed, cause a system to perform operations comprising:

detecting a first object and a second object;

generating a first embedding associated with the first object and a second embedding associated with the second object;

generating, based at least in part on a pose of the first object, a first matrix;

generating, based at least in part on a position of the second object, a second matrix;

determining, based at least in part on the first matrix and the second matrix, a first modified embedding associated with at least one of the first embedding or the second embedding;

inputting the first modified embedding into an attention layer; and controlling a vehicle based at least in part on output data of the attention layer.

7. The one or more non-transitory computer-readable media of claim 6, wherein determining the first modified embedding comprises:

determining, as the first modified embedding and based at least in part on the first matrix, modified queries; and determining, as a second modified embedding and based at least in part on the second matrix, modified keys.

8. The one or more non-transitory computer-readable media of claim 6, wherein the first matrix and the second matrix are associated with a relative longitudinal angle or a relative lateral angle.

9. The one or more non-transitory computer-readable media of claim 6, wherein the first embedding is a feature vector, wherein determining the first modified embedding comprises:

determining, based at least in part on the feature vector, a first sub-feature vector and a second sub-feature vector;

determining, based at least in part on the first matrix and the second matrix, a first modified sub-feature vector; and determining, based at least in part on a plurality of matrices, a second modified sub-feature vector.

10. The one or more non-transitory computer-readable media of claim 9, wherein the first modified sub-feature vector is modified based at least in part on a longitudinal relative angle and the second modified sub-feature vector is modified based at least in part on a lateral relative angle.

11. The one or more non-transitory computer-readable media of claim 9, wherein determining the first modified embedding further comprises:

determining, based at least in part on combining the first modified sub-feature vector and the second modified sub-feature vector, the first modified embedding.

12. The one or more non-transitory computer-readable media of claim 6, wherein controlling the vehicle comprises:

generating modified output data, based at least in part on the first matrix, the second matrix, and the output data; and controlling the vehicle based at least in part on the modified output data.

13. The one or more non-transitory computer-readable media of claim 12, wherein generating the modified output data comprises:

determining, based at least in part on the output data, multiple sub-feature vectors; and modifying the multiple sub-feature vectors.

14. The one or more non-transitory computer-readable media of claim 6, wherein the first object or the second object is the vehicle.

15. A method comprising:

detecting a first object and a second object;

generating a first embedding associated with the first object and a second embedding associated with the second object;

generating, based at least in part on a pose of the first object, a first matrix;

generating, based at least in part on a position of the second object, a second matrix;

determining, based at least in part on the first matrix and the second matrix, a first modified embedding associated with at least one of the first embedding or the second embedding;

inputting the first modified embedding into an attention layer; and controlling a vehicle based at least in part on output data of the attention layer.

16. The method of claim 15, wherein determining the first modified embedding comprises:

determining, as the first modified embedding and based at least in part on the first matrix, modified queries; and determining, as a second modified embedding and based at least in part on the second matrix, modified keys.

17. The method of claim 15, wherein the first embedding is a feature vector, wherein determining the first modified embedding comprises:

determining, based at least in part on the feature vector, a first sub-feature vector and a second sub-feature vector;

determining, based at least in part on the first matrix and the second matrix, a first modified sub-feature vector; and determining, based at least in part on a plurality of matrices, a second modified sub-feature vector.

18. The method of claim 17, wherein the first modified sub-feature vector is modified based at least in part on a longitudinal relative angle and the second modified sub-feature vector is modified based at least in part on a lateral relative angle.

19. The method of claim 17, wherein determining the first modified embedding further comprises:

determining, based at least in part on combining the first modified sub-feature vector and the second modified sub-feature vector, the first modified embedding.

20. The method of claim 15, wherein controlling the vehicle comprises:

generating modified output data, based at least in part on the first matrix, the second matrix, and the output data; and controlling the vehicle based at least in part on the modified output data.

* * * * *